(12) United States Patent
Meier

(10) Patent No.: US 12,205,055 B2
(45) Date of Patent: *Jan. 21, 2025

(54) MODELING SYSTEM FOR ENERGY SYSTEMS

(71) Applicant: Paul J. Meier, Stoughton, WI (US)

(72) Inventor: Paul J. Meier, Stoughton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/995,478

(22) Filed: Aug. 17, 2020

(65) Prior Publication Data

US 2020/0381919 A1    Dec. 3, 2020

Related U.S. Application Data

(63) Continuation of application No. 15/263,119, filed on Sep. 12, 2016, now Pat. No. 10,749,339.

(60) Provisional application No. 62/332,635, filed on May 6, 2016, provisional application No. 62/217,522, filed on Sep. 11, 2015.

(51) Int. Cl.
| | |
|---|---|
| G06Q 10/063 | (2023.01) |
| G05B 17/02 | (2006.01) |
| H02J 3/00 | (2006.01) |
| H02J 3/06 | (2006.01) |
| H02J 13/00 | (2006.01) |
| G06Q 50/06 | (2012.01) |

(52) U.S. Cl.
CPC .......... *G06Q 10/063* (2013.01); *G05B 17/02* (2013.01); *H02J 3/00* (2013.01); *H02J 3/003* (2020.01); *H02J 3/06* (2013.01); *H02J 13/00001* (2020.01); *G06Q 50/06* (2013.01); *H02J 3/0012* (2020.01); *H02J 2203/20* (2020.01); *Y02E 60/00* (2013.01); *Y02P 90/845* (2015.11); *Y04S 40/20* (2013.01)

(58) Field of Classification Search
USPC .......................................................... 700/291
See application file for complete search history.

(56) References Cited

U.S. PATENT DOCUMENTS

| | | | |
|---|---|---|---|
| 7,171,374 B1 * | 1/2007 | Sheehan | G06Q 10/06315 705/7.25 |
| 8,260,468 B2 * | 9/2012 | Ippolito | H02J 3/14 700/286 |
| 2008/0319893 A1 * | 12/2008 | Mashinsky | G06Q 10/06313 705/37 |

(Continued)

*Primary Examiner* — Emilio J Saavedra
(74) *Attorney, Agent, or Firm* — K&L Gates LLP

(57) ABSTRACT

A system for modeling networks of electricity supply and demand includes a first user interface, a second user interface, a database, a controller, and a memory including instructions. The database includes a data set defining nodes and domains, each node being a geographic area with defined electricity supply and demand, each plan including instructions related to a node for managing energy infrastructure and supply and demand changes. The controller is configured to: receive a first request to create a first plan for a first node of a collection; receive plan instructions for the first plan; receive a second user request to create a second plan for a second node of the collection; receive a plan instruction to interconnect the first node with the second node in the first plan; generate a forecast including a projected value for an energy infrastructure variable; and display the forecast.

18 Claims, 32 Drawing Sheets

(56) References Cited

U.S. PATENT DOCUMENTS

| | | | |
|---|---|---|---|
| 2014/0039699 A1* | 2/2014 | Forbes, Jr. | H02J 13/00004 |
| | | | 700/286 |
| 2014/0039709 A1* | 2/2014 | Steven | G06Q 10/06 |
| | | | 700/291 |
| 2016/0132804 A1* | 5/2016 | Croft | G06Q 10/06313 |
| | | | 705/7.23 |

* cited by examiner

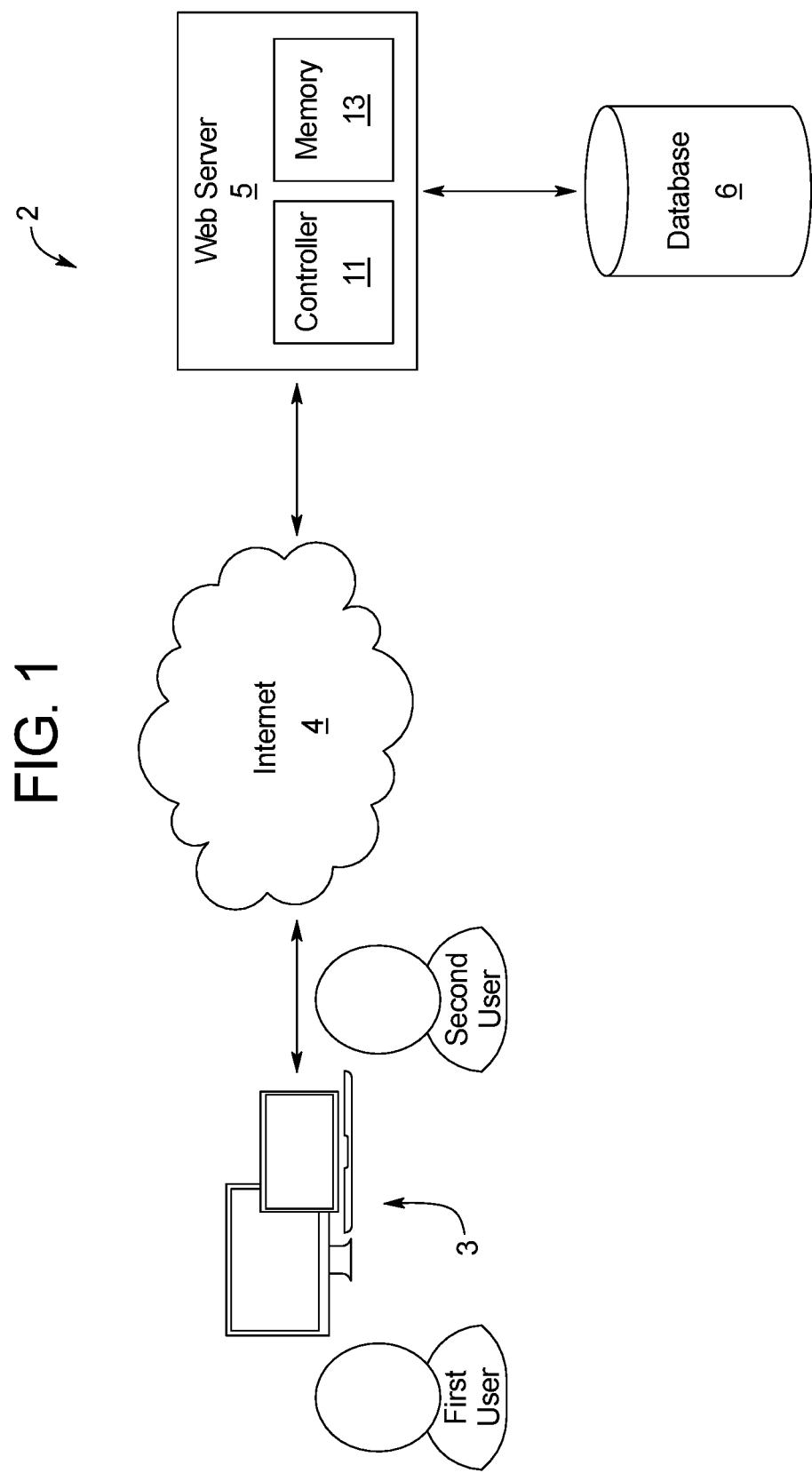

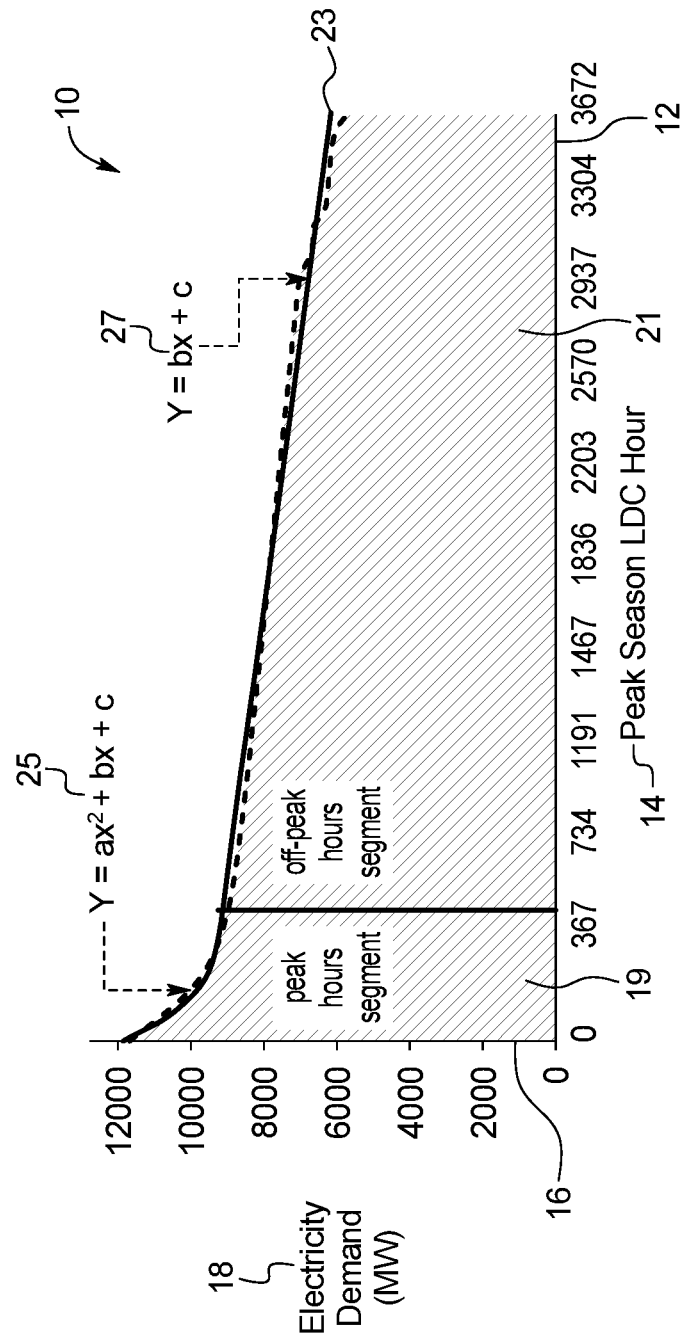

FIG. 17

Power Plant Editor

| Unit Info | Location | Specs | Costs | Emissions |

Unit Name: Hat Rapids
Unit Address: 6268 Hat Rapids RD; Rhinelander, WI 54501
Respondant: Wisconsin Public Service Corp
Description: Hydro

[update session only] [update all] [update all ORIS] [cancel]

FIG. 22

| Generating Units | | | | | | | | | | |
|---|---|---|---|---|---|---|---|---|---|---|
| 1 2 3 4 5 6 7 8 9 10 11 | | | | | | | | | | |
| id | EGU ID | Name | Description | Owner | Addr... | ORIS | Unit | Lat | Lon | Touched |
| 176109 | 16923 | AMERESC... | Landfill Gas | AMERE... | 525 Bl... | 56427 | Unit3 | 42.7074 | 89.0196 | -- |
| 176108 | 16922 | AMERESC... | Landfill Gas | AMERE... | 525 Bl... | 56427 | Unit2 | 42.7074 | 89.0196 | -- |
| 176107 | 16921 | AMERESC... | Landfill Gas | AMERE... | 525 Bl... | 56427 | Unit1 | 42.7074 | 89.0196 | -- |
| 175777 | 16590 | Alexander | Hydro | Wisconsi... | N193... | 4060 | 3 | 45.1873 | 89.7556 | -- |
| 175776 | 16589 | Alexander | Hydro | Wisconsi... | N193... | 4060 | 2 | 45.1873 | 89.7556 | -- |
| 175775 | 16588 | Alexander | Hydro | Wisconsi... | N193... | 4060 | 1 | 45.1873 | 89.7556 | -- |
| 176055 | 16869 | Alliant Ener... | Combustion... | Wisconsi... | 200 C... | 55135 | CT02 | 44.1938 | 88.5055 | -- |
| 176054 | 16868 | Alliant Ener... | Combustion... | Wisconsi... | 200 C... | 55135 | CT01 | 44.1938 | 88.5055 | -- |
| 175900 | 16713 | Alma | Coal Steam | Dairylan... | 1420... | 4140 | B5 | 44.3082 | 91.9110 | -- |
| 175899 | 16712 | Alma | Coal Steam | Dairylan... | 1420... | 4140 | B4 | 44.3082 | 91.9110 | -- |
| 175898 | 16710 | Alma | Coal Steam | Dairylan... | 1420... | 4140 | B2 | 44.3082 | 91.9110 | -- |
| 175897 | 16709 | Alma | Coal Steam | Dairylan... | 1420... | 4140 | B1 | 44.3082 | 91.9110 | -- |
| 175851 | 16711 | Alma | Coal Steam | Dairylan... | 1420... | 4140 | B3 | 44.3082 | 91.9110 | -- |
| 175928 | 16741 | Apple River | Hydro | Northern... | 2040... | 6231 | 4 | 45.1576 | 92.7155 | -- |
| 175927 | 16740 | Apple River | Hydro | Northern... | 2040... | 6231 | 3 | 45.1576 | 92.7155 | -- |
| 175926 | 16739 | Apple River | Hydro | Northern... | 2040... | 6231 | 1 | 45.1576 | 92.7155 | -- |
| 175745 | 16556 | Appleton | Hydro | Wisconsi... | 201... | 4043 | 5 | 44.2541 | 88.4084 | -- |
| 175744 | 16555 | Appleton | Hydro | Wisconsi... | 201... | 4043 | 4 | 44.2541 | 88.4084 | -- |

FIG. 23

Instructions — 420

405 — ⊗

All Instructions ← 401

| id | plan | Year | | Instruction | Q. | F. | Unit |
|---|---|---|---|---|---|---|---|
| 8594 | 885 | 2014 | ○ | Add APC to Edgewater | 1 | | |
| 8600 | 888 | 2024 | ⚒ | Add New Nuclear - Li... | 20 | ⚛ | New Nuclear - Light ... |
| 8611 | 885 | 2015 | ⚒ | Add Wind Purchases ... | 10 | | Wind Purchases from ... |
| 8614 | 888 | 2015 | ⚒ | Add New Natural Gas... | 15 | | New Nuclear Gas - Co... |

421, 422

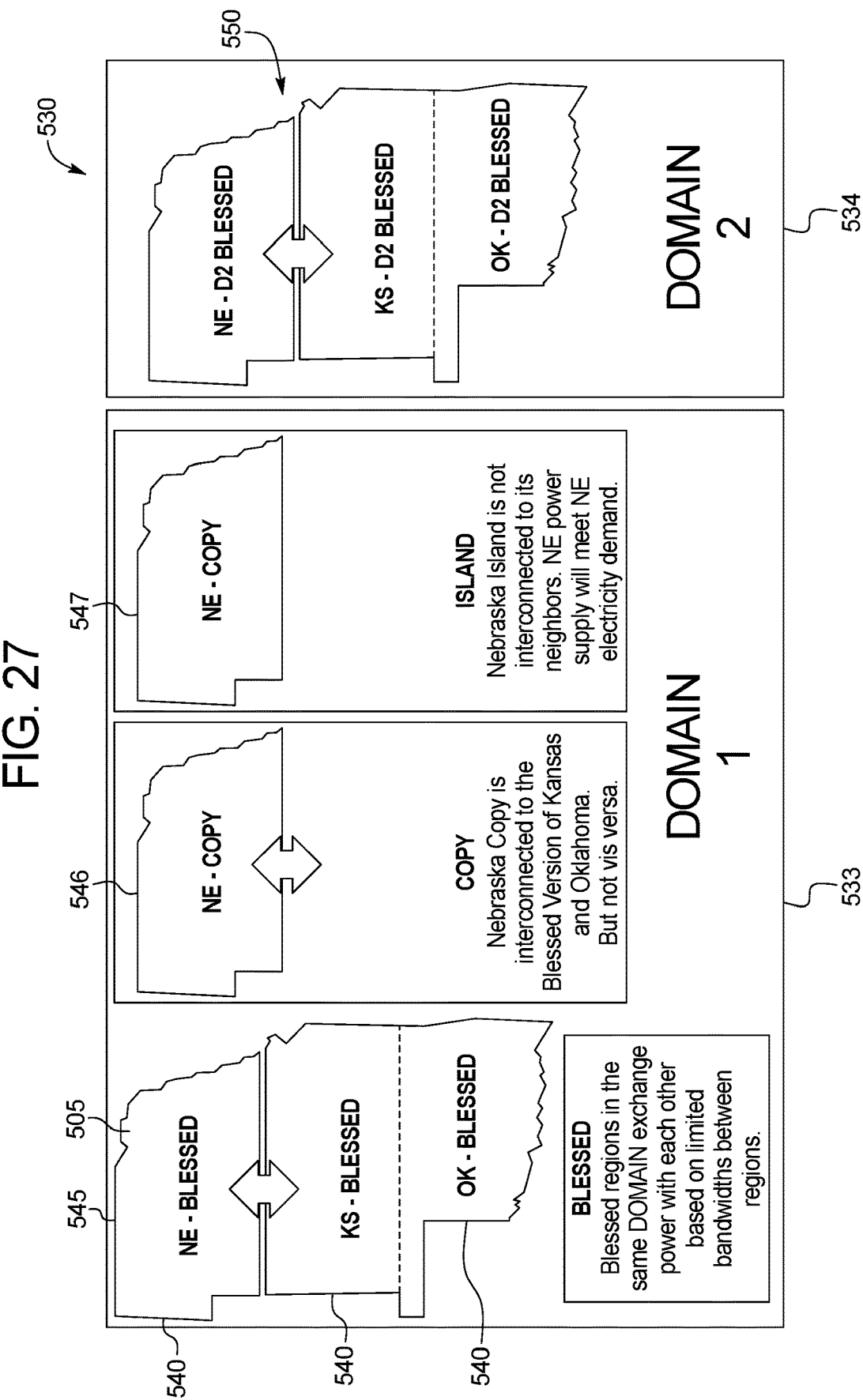

New Plan

| Owner: | Paul Meier |
| Group: | Alabama-Georgia |
| Name: | New Plan |
| Description: | A new plan |

Copy Existing Plan?: ☐  Base Plan: IN demo  Scenario #: 1

Copy Variables?: ☑  Copy Instructions?: ☐

505 — Node: ☐  Domain: EDU — 530

Start Year: 2007

| EDU |
| State Grids |
| testing |
| state grid domain 2 |
| Midgard-Vanaheim |

Planning Reserve: 0.15

Regional Dispatch: ☐

Permissions

| Owner | Read: ☑ | Edit: ☑ | Destroy: ☑ |
| Group | Read: ☑ | Edit: ☐ | Destroy: ☐ | — 680
| World | Read: ☐ | Edit: ☐ | Destroy: ☐ |

Cancel  Save

MODELING SYSTEM FOR ENERGY SYSTEMS

CROSS-REFERENCE TO RELATED APPLICATIONS

This application comprises a continuation application claiming priority to U.S. patent application Ser. No. 15/263,119 filed Sep. 12, 2016, which claims the benefit of priority to U.S. Provisional Patent Application No. 62/217,522 filed Sep. 11, 2015, and U.S. Provisional Patent Application No. 62/332,635 filed May 6, 2016, the disclosures of which are incorporated by reference herein.

BACKGROUND OF THE INVENTION

The present subject matter relates generally to energy modeling. More specifically, the present invention relates to a software platform for modeling and simulating an energy marketplace.

In recent years, various governmental agencies have issued environmental regulations and initiatives with the goal of creating a clean energy future. A number of these regulations and initiatives are geared toward reducing air pollutants (e.g. carbon dioxide) generated by power plants. The general goal of these initiatives and regulations is to reduce energy demand, directly control emissions, and switch to less emitting fuels (e.g. renewable fuels, nuclear energy, natural gas).

A clean energy future will require massive investment in new infrastructure, such as solar cells, nuclear power, and wind turbines—integrated with coal and natural gas power plants on a more resilient and intelligent grid that interacts with buildings and vehicles. Some estimates conclude that the United States will require over $2.1 trillion in energy infrastructure investments over the next 30 years in order to modernize the electric grid and develop cleaner sources of energy.

To achieve the goal of a clean energy future, one of the more important tools used in the energy sector is an energy modeling software platform, which is used to evaluate strategies, projects, plans, and policies pertaining to energy systems scenarios and alternatives. Such activities are commonly subjected to multiple viewpoints and opinions spanning multiple organizations, including energy companies, government regulators and policy-makers, consultants, researchers, and public interest groups.

An energy model generally consists of a system characterization data schema (SCDS) and at least one modeling algorithm. The SCDS is generally used to construct and describe scenarios consisting of hypothetical or virtual energy demand, supply, equipment, infrastructure, fuels, and markets. The modeling algorithm generally consists of formulas and computing programs used to project the performance of the modeled system in terms that are energetic (i.e. flow of energy supply and demand), financial (i.e. costs, rates, revenues, and/or expenses), and physical (i.e. quantities of fuel and exhaust emissions).

Previous energy planning and production software platforms were generally not ideal for large-scale national modeling for a variety of reasons some of which include the lack of balance between scalability and granularity, the complexity of the software, the lack of lack of data management and quality assurance, the lack of wide spread collaboration from all stakeholders Previous energy simulation software platforms must inherently trade-off between the simulation scale (i.e. geographic, granularity) and efficacy; therefore, the software cannot be effectively used at a large scale and with high granularity. Previous software typically constrained the analysis to a limited size, such that the modeling algorithms could solve (i.e., compute the projection) in a reasonable amount of time. Previous tools typically, but not necessarily, computed the projection using an optimization algorithm that intended for the computer program to identify a "best" solution among a limited number of alternatives. This limitation was necessary so that the software could compute the projection in a reasonable time frame, with batch-runs frequently computed overnight. To keep computation manageable, the typical solution was to limit the geographic jurisdiction of the analysis.

While utility planning products are typically limited in geographic scale, national models are typically limited in granularity. The national tools simplify the characterization of infrastructure and flows of energy are limited and simplified (reduced to fewer numbers of hypothetical components), such as combining all regional hydro-electric facilities into a single large hypothetical hydro-electric modeling object that is parameterized with averaged characteristics. In other words, existing software must sacrifice scale and/or granularity—or—be inconvenienced by longer solve times or failed solve-attempts (exceed algorithmic computing capacity). Neither approach allows for a highly detailed simulation (e.g., of individual power plants) at national scale, such that the implications of national scenarios may be directly simulated across the real-world companies that actually own and operate the energy infrastructure.

Further, previous platforms were generally complex and expensive to purchase and initiate. Procurement and set up of these platforms generally took weeks, thus limiting the user-base to industry experts and those who could afford expensive software.

The complex and expensive nature of previous platforms created a situation such that the platforms were not amenable to stakeholder engagement. State and local economies are be greatly influenced by whether their efforts to "green" the power grid are effective and efficient. Technical and regulatory analysis for these investment decisions is typically performed in state regulatory forums using proprietary utility modeling software. The expense and complexity of previous software products prevented public interest stakeholders, policy researchers, academia, and the general public from directly participating in this important analysis and associated conversations.

Further, previous platforms had limited capacity for rigorous data management and quality assurance. The scaling limitations and complex nature of existing platforms means that a relatively few number of experts are engaged in simulating large power systems. As such, the market for utility products was generally limited to a relatively small number of industry and regulatory users and consultants, while national models are limited to academic and government researchers. The practical reality is that the data quality of inputs and results is made difficult by the sheer magnitude of data being reviewed by such few participants.

Additionally, previous software platforms did not support integrated multi-userism, but instead were used by single independent users and provided a singular modeling solution over the entirety of a defined system boundary. No software platform distributed and coordinates independent planning efforts in an integrated platform and no platform was capable of commercializing a virtual marketplace comprised of many future energy and climate policy scenarios. Further, no platform could be deployed to support multifunctional policy compliance analysis and reporting.

Existing platforms can generally be categorized into four families—long-term utility planning software, short-term production simulations, national modeling tools, and web calculators.

Previous long-term utility planning software was generally used only for evaluation up to regional (multi-state) scale. Long-term software lacked the ability to scale geographically while also maintaining high granularity. While some long-term software is currently used for national scale simulation, the software is not normally licensed for third-party use, but rather used as a proprietary consulting product. Further, the software is not multi-user deployable and requires external post-processing for fine grained details and is not made open or transparent to the public.

Alternatively, previous short-term production simulation software, was highly granular, but lacked the ability to scale geographically or temporally to long time frames while keeping the same level of granularity. Utility companies utilize hourly production models and/or power-flow simulation to perform comparable analysis. In general, the increased complexity of these tools, including the temporal effects of power plants, market operations, transmission, and distribution systems, prohibited these tools from being used for analysis over long time frames or large geographic scales. Hourly production simulation is also scale-limited and does not allow for networked multi-users.

Previous national modeling tools did not offer the granularity to simulate individual power plants with the specificity required by utilities or regulators. While a few commercial software programs existed that evaluated the impact of national energy policies and strategies, these platforms were often onerous and were typically managed by governmental and research institutions in conjunction with experienced consultants. Other software programs only provided a life-cycle assessment for transportation fuels.

While, numerous energy and environmental web calculators exist and provide easy access and some transparent data, but do not offer rigorous power sector modeling that would be considered acceptable for regulatory purposes.

Accordingly, there is a need for an energy planning system that provides a networked software platform that simulates energy systems on a large geographic scale with high granularity, while also enabling crowd sourced data management and quality assurance commensurate with magnitude of data inputs and outputs and efficient sharing of user-generated energy simulations, as described herein.

BRIEF SUMMARY OF THE INVENTION

To meet the needs described above and others, the present disclosure provides for an energy planning system that provides a networked software platform that simulates energy systems on a large geographic scale with high granularity, while also enabling crowd sourced data management and quality assurance commensurate with magnitude of data inputs and outputs and efficient sharing of user-generated energy simulations. In an embodiment, the energy planning system may utilize the MyPower model described in S. Plachinski, T. Holloway, P. J. Meier, G. Nemet, C. Voigt, J. Oberman (2014) *Quantifying the Air Quality Co-benefits of Lower-Carbon Electricity Production. Atmospheric Environment September* 2014, 94:180-191. DOI:10.1016/j.atmosenv.2014.03.028 (which is incorporated herein by reference).

By providing an energy planning system that includes a networked, peer-to-peer, multi-user energy model that largely diminishes the trade-off between geographic scale and granularity, the disclosed system may model and simulate a nationally informed, but locally implementable, long-term energy strategy, while also reducing the time, complexity, and costs associated with conceiving, evaluating, deliberating, planning, sharing, regulatory consideration, and public consideration associated with energy policies, strategy, programs, and projects.

The disclosed system is part national energy model and part networked collaboration platform, and thus, provides a national modeling and simulation program, which is embedded into an Internet-based integrated software platform. The disclosed system may compromise a networked energy modeling and simulation approach (e.g. algorithms) and a web-based integrated software platform that facilitates the networking of both the model and cooperating users.

The energy model may calculate projections for future energy (i.e. electricity) demands. Underlying energy-sector models may simulate the flow of energy supply, through energy infrastructure (e.g. power plants), to meet end-user demand. To meet increasing demands and changing regulations, the software platform's users may explore and install various alternatives of energy production (e.g. hydro-electric, solar power, wind power) and energy efficiency technologies, whose prototypes may be either generic, or developed by real world energy technology vendors. The software platform may act as an objective accountant, monitoring the technical financial, and environmental performance and consequences of proposed infrastructure investments, and providing rapid feedback on both national (e.g. federal) and local (e.g. state) planning requirement, such as renewable portfolio standards, capacity reserve requirements, and U.S. Environment Protection Agency (EPA) regulations.

By using networking and permissions, the disclosed system provides a coordinated community, where industry and independent energy experts, governmental institutions (e.g. U.S. EPA), and the public all play a unique role. Industry experts can develop sharable planning alternatives, develop and validate scenarios, and "adopt" virtual versions of their own company's infrastructure, manage the data, and validate or "tune" the infrastructure or scenario data for improved accuracy. Governmental institutions and other independent experts may manage data and assumptions such that it is validated and/or transparent and readily accessible for public review and deliberation. To communicate energy challenges and to better understand consumer preferences, the disclosed system may be employed as an educational platform; providing a real world exploration and simulation of how the energy system works. Further, the disclosed system may merge the energy plans of many cooperating users, combining local and state-level actions into regional and national projections.

One of the largest obstacles in progressing towards a "green" electricity grid is affordability. In previous conventional "black-box" energy modeling, stakeholders may be unsure if all cost-effective solutions were fairly considered. Utility companies may also have concerns about whether the costs associated with electricity transmission or distribution was reasonably included. In energy modeling, cost assumptions may be generic simplifications, whereas in real-world projects, every circumstance may be unique.

The disclosed system may solve this problem by coordinating the insights of many experts within a virtual electricity system and making all of the modeling inputs fully transparent, such that every assumption can be readily viewed and scrutinized. Thus, by working with local experts, generic cost assumptions may be fine tuned to estimate impacts to electricity rates. The collaboration between local experts ensures the best reflection of real world operating conditions.

In one embodiment, the disclosed system may provide a networked software platform, thus making it possible for electric utilities, regulators, the public, and other interested groups (e.g. industry experts) to collaborate on the examination alternatives. This also allows the software platform to create and manage a diverse group of cooperating stakeholders.

Additionally, the disclosed system may provide a software platform that supports controlled multi-organization analysis, thus offering an opportunity for pro-active engagement among local and national energy decision makers. For example, in some embodiments, utility planners may propose power supply alternatives, regulators may review them, and public interest groups may examine the assumptions. The options and impacts may be shared with the public-at-large through the disclosed system's Internet based software platform. While energy resources and preferences are local, the objectives for energy planning are national and even global in scope, and therefore, the disclosed system may be capable of networking many locally constructed scenarios into regional and national scenarios.

The software platform may also incorporate flexible graphing functions and satellite imagery to create an immersive environment from which to support a functioning electricity-sector model encompassing all U.S. power plants. The application platform may consist of a backend database server that holds data necessary to simulate energy systems and coordinate multi-user access and a front-end web application server that includes modeling algorithms, which simulate energy system performance. The front-end application may run on the client's web-enabled device. The application may make requests for data to the middle tier web host server. These requests may be validated before being passed along to the database server. Data may be aggregated as necessary and returned back to the mid-tier server, which passes it back to the client application.

In order to model and simulate the electric power sector, the disclosed system may use common industry approaches to energy, financial, and emissions accounting. The "heart" of any power sector model is a "dispatch" calculation, which estimates the performance of individual power plants. The dispatch may solve for a least-cost solution to load duration curves using available generation resources. Power plant-specific generation and emission estimates may be calculated as a function of fuel prices, heat rate, emission rate, and air pollution control efficiency. Production cost estimates may be estimated for each power plant based on its capital cost, variable and fixed operating and maintenance cost, and fuel cost. Financial assumption may be applied generically, or specified uniquely for each generating unit.

The disclosed system may utilize a load duration curve (LDC) for power-sector simulation, termed LDC modeling. An LDC is a load shape that illustrates the variation of a certain load in a downward form such that the greatest load is plotted on the left and the smallest load is plotted on the right, while on the time axis, the time duration for which each certain load continues during the day. Generally, load duration curves are used to estimate the amount of load that is present for a certain number of hours.

LDC models typically solve multiple segments representing sub-divided periods of the year. The disclosed system may utilize an LDC model that divides 8760 hours of the year into four segments representing two periods—peak hours and off peak hours and two seasons—peak and off-peak. Peak season may be defined as May 1 to September 30, and off-peak season may be defined as the remainder of the year.

Load shapes may be characterized using a polynomial spline, specifically a second-order polynomial describing peak hours and a first order polynomial defining the off-hours segment. This load shape may be characterized from historic demand data. Electricity demand may be defined by load shapes and may either be generically adjusted to reflect variable growth rate assumptions, or be set to more precise pre-established load shapes unique to each future year. The latter may allow for the incorporation of more rigorous energy efficiency modeling, when such studies and data are available.

The disclosed system may utilize a dispatch routine that estimates electricity generation from each power plant to satisfy seasonal load duration curves (LDC) defining demand. Individual power plants may be dispatched in the ranked order of their marginal operating cost. Marginal operating cost may be calculated as a function of plant's mean heat rate, fuel price, variable operating and maintenance, and any other cost factors (e.g., emission prices) assigned to the plant. Each power plant's electricity generation may be established by their available capacity for each period, which is the amount of energy needed to satisfy the local system's load shape.

A single instance of this modeling approach may account for regional electricity trade by simulating two interconnected systems. The disclosed system may network many such LDC model systems together, thus providing high-granularity local modeling that can scale-up across regional and national scales. This results in a two-system single-tie model, wherein a smaller (i.e. local) LDC-modeled system and a larger (i.e. regional) LDC-modeled system may interact via a single tie, wherein a tie represents aggregate transmission "bandwidth" by which the local and regional system may exchange power).

Simulation of the larger market system may establish whether the local system's marginal power plants are generating power that is more expensive, or less expensive, than the wholesale market price and estimates the quantity of market purchases or sales possible through a constrained tie (transmission bandwidth) between the two systems.

The disclosed system may network the smaller-scale LDC simulations into a coordinated macro-simulation via a "fried egg" approach, wherein the "yolk" represents a smaller local system, which is surrounded by a second regional system. The disclosed system may network a system of nodes that may correspond to utility, state, or regional power systems. Each node is defined in terms of its local characteristics (e.g. energy supply and demand) and the neighboring nodes that it interacts with. A node may be parameterized to interact with no other neighboring nodes, several neighboring nodes with equivalent power exchanging ability, or several nodes with unique power exchanging ability.

The disclosed system may then simulate each node using an a-synchronous modeling method, wherein each node or region may be independently simulated and/or cooperatively managed among neighboring or national efforts. The disclosed system may account for energy transactions between nodes and estimate the cumulative impact of the aggregate efforts.

The disclosed system may provide various scenario simulations that illustrate how different resource alternatives affect reliability, cost, and emissions under user-defined scenarios. The power-sector model may estimates the performance of each individual power plant unit. Graphs may provide rapid feedback on the cumulative impact of all resources, relative to prescribed planning and compliance metrics. Plans are a combination of a scenario (which defines variables) and instructions (which define changes to the system).

Plans are loaded into the energy planning system via the software platform. After a plan is loaded, the software platform may display a map with fuel specific, color-coded icons that appear as existing power plant facilities. The system may be able to run a simulation to calculate the performance of every power plant individually and in aggregate.

Upon the system running the simulation, the software platform may display the power plant performance results along with a "generation" graphic, illustrating the resulting statewide electricity fuel mix throughout the planning horizon. The software platform may also provide the ability to display more detailed information, including a plant-by-plant summary. The plant-by-plant summary may provide information for each plant, such as peak capacity, generation, and pollutant emissions. For the purposes of quality assurance, the system forecast may also display simulated performance against historical performance either graphically or numerically. The software platform may also provide the ability to adjust various simulation inputs, including fuel price assumptions, other variables.

The system may also be able to generate and display, via the software platform, various simulation related graphs. These graphs may include a peak capacity graph, an RPS compliance graph, generation cost graph, and average rate graph. The peak capacity graph may display the available generating capacity relative to projected peak electricity command. The RPS compliance graph may display contributions from renewables. The generation cost graph may display the total plant costs. The average rate graph may display the average cents per kWh costs for generation, transmission, and distribution. Graphs depicting sulfur dioxide, nitrogen oxide, and carbon dioxide emissions may also be available.

Policy and planning objectives may be plotted along with each graph indicating if the objective has been met in a given year. Each graph may include a color-coded compliance bar that that indicates if the objective is met for that specific year. For example, if the segment is green, the objective is met, but if the segment is green, the objective is not met. Each policy and planning requirement may be required as a user defined instruction.

In an embodiment, a system for modeling networks of electricity supply and demand includes: a first user interface; a second user interface; a database including a data structure that defines one or more collections, each collection being a data set defining one or more nodes and one or more domains, each node being a geographic area with defined electricity supply and demand, each domain is a group of plans, each plan including instructions related to a node for managing energy infrastructure, cost changes over time, and supply and demand changes for electricity over time, a controller in communication with the database, the first user interface and the second user interface; and a memory including instructions, that when executed by the controller, cause the controller to: receive, via the first user interface, a first request to create a first plan for a first node of a collection, the first request specifying a domain of the collection, receive, via the first user interface, plan instructions for the first plan, receive, via the second user interface, a second user request to create a second plan for a second node of the collection, the second user request specifying the domain of the collection, receive, from the first user interface, a plan instruction to interconnect the first node with the second node in the first plan, in response to a user request to solve the first plan, generate a forecast including a projected value for an energy infrastructure variable using the assumptions provided in the first plan and the second plan, and display the forecast on the first user interface of the first user.

In some embodiments, the forecast includes a graphic representation for the first plan illustrating the energy supply contributions to first node demand, the graphic including imports of electricity supply from the second node according to the second plan.

And in some embodiments, the one or more collections includes a second collection defining one or more nodes of a different granularity than the first node and the second node, wherein the collection includes a first set of nodes encompassing a first scope of geography, and the second collection includes a second set of nodes of a different number of nodes encompassing a distinct scope of geography from the first set of nodes.

Also, in some embodiments, the controller is further configured to: receive, via the second user interface, an additional request to create an additional plan for a second node of the collection, the additional request specifying the domain of the collection, in response to receiving a request via the second user interface to record the additional plan as blessed, recording the additional plan as blessed in the data structure, in response to a user request to solve the first plan where the first plan includes instructions to interconnect the first node with the second node, performing a lookup in the data structure to select the currently blessed plan for the second node as recorded in the data structure, generate a forecast including a projected value for an energy infrastructure variable using the assumptions provided in the first plan and the currently blessed plan for the second node, and display the forecast on a user interface of the first user.

In some embodiments the a plan instruction to interconnect the first node with the second node in the first plan includes: a plan instruction to define a transmission bandwidth to the first node, a plan instruction to define the second node as a neighbor, and a plan instruction to define a regional loadshape corresponding to aggregate loads in the first node and the second node.

And, in some embodiments, the collection defines one or more transmission links between one or more nodes, wherein each transmission link is associated with one or more de-rating weighting factors.

Additionally, in some embodiments, the forecast includes both a projected value and a determination of compliance of at least one variable of the list of variables including peak capacity, electricity generation, renewable electricity supply, generation cost, average rate, and emissions of sulfur dioxide, nitrogen oxide, and carbon dioxide.

Finally, in some embodiments, the step of generate a forecast including a projected value for an energy infrastructure variable using the assumptions provided in the first plan and the second plan includes solving a regional dispatch for an aggregate regional load shape within the domain to generate the forecast, wherein, during solving, all electricity generating units in the first node and the second node are dispatched, wherein, during solving, all electricity generating units in the instructions of the first plan and the second plan are also dispatched.

An objective of the disclosed system is to provide an energy modeling system that provides for a large-scale energy simulation that minimizes the trade-off between geographic scale and granularity.

Another objective of the disclosed system is to provide an efficient and coordinated approach to national energy planning where all interested groups, including utilities, governmental departments, and the public to collaborate on energy planning, rule-making, regulation, public education, and customer adoption.

Yet, another objective of the disclosed system is to provide a networked software platform that is connected to multiple users and capable of running local simulations regionally in order to capture neighboring influences.

An objective of the disclosed system is to provide efficient energy planning. The software manages users, inputs, and scenarios for fluid collaboration. Inputs and assumptions are easily modified, eliminating the confusion of divergent spreadsheets.

An advantage of disclosed system is that it may act as an objective accountant, monitoring the technical financial, and environmental performance and consequences of proposed infrastructure investments, and providing rapid feedback on both national (e.g. federal) and local (e.g. state) planning requirement, such as renewable portfolio standards, capacity reserve requirements, and U.S. Environment Protection Agency (EPA) regulations.

Another advantage of the disclosed system is that is provides an energy modeling and simulation approach that does not sacrifice geographic scale for granularity. Thus, the system may provide large scale, but highly granular, energy simulations.

Yet, another advantage of the disclosed system is that is provides a transparent energy modeling software platform that is transparent to all users. Instead of using opaque "black-box" data calculation, the disclosed system is highly transparent and makes all input data discoverable to the user.

Yet another advantage of the disclosed system is that once it is appropriately parameterized, it does not require significant technical experience to operate and is accessible to a broad array of stakeholders.

Yet another advantage of the disclosed system is that it is not labor and time intensive. The disclosed system users a simple user-interface and does not attempt to optimize solutions, but rather it solves discreet user-constructed scenarios quickly.

Yet another advantage of the disclosed system is that it provides a low cost energy modeling software platform by leveraging data from established modeling programs and by cost-sharing across a broad audience of users.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1 shows a schematic of an energy modeling and simulation system (the "modeling system").

FIG. 2 shows a graph depicting a load duration curve (LDC) characterization technique.

FIG. 17 shows an exemplary user interface for the software platform of FIG. 1 displaying window to install an addition into an energy plan.

FIG. 22 shows an exemplary user interface for the software platform of FIG. 1 displaying a window to view and edit instructions utilized by a plan.

FIG. 23 shows an exemplary user interface for the software platform of FIG. 1 displaying a fuel prices graph.

FIG. 27 illustrates is a three-user example showing how a user may connect his or her plan to other blessed plans within a domain.

FIG. 30B illustrates a new plan window to enable a user or administrator to create a new plan for a node.

DETAILED DESCRIPTION OF THE INVENTION

Figure 3B:
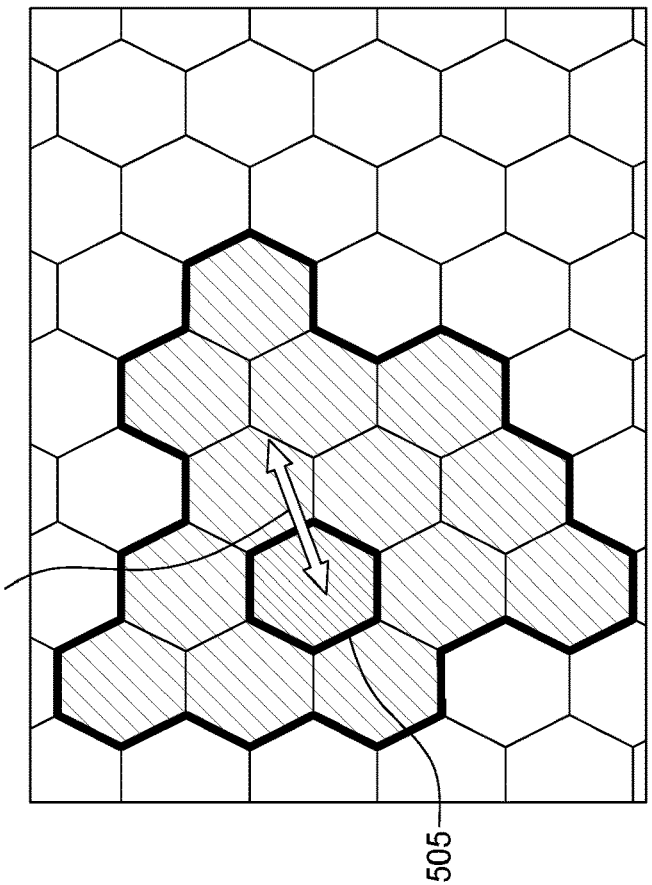
FIG. 3B illustrates the two-system approach of the modeling system of FIG. 1.

FIG. 1 illustrates an exemplary system diagram for a modeling system 2. Users may use the modeling system 2 to collaborate on various electricity planning models for use in making projections about future demand, future costs, and other economic projections about local, regional, national, and international power systems that may be used for planning, education, etc.

The modeling system 2 may include user devices 3 (e.g. desktop, laptop, tablet) that connect to a web server 5 through the Internet 4. User devices 3 may used to access a software platform 3 that may be executed on a web server 5. In an embodiment, the user devices 3 may act as the user interface of the modeling system 2. Accordingly, in an embodiment, a first user device 3 may be a first user interface of a first user, and a second user device may be a second user interface of a second user.

The web server 5 retrieves data, including saved plans and scenarios, from a database 6. Upon retrieving the requested data from the database 6, the web server 5 sends the data to the user device 3 through the Internet 4. The database 6 stores data necessary to simulate energy systems and coordinate multi-user access. The web server 5 may include a controller 11, and a memory 13. The memory 13 may include instructions, that when executed by the controller 11, cause it to perform any of the functionality described in the present disclosure.

The database 6 may include a stored data structure 580 (FIG. 29) of the modeling system. The stored data structure 580 may include stored definitions of one or more collections 560 (FIG. 28) of nodes 505 (FIG. 27). The stored data structure 580 may additionally include stored definitions of one or more domains 530 (FIG. 27).

The modeling system 2 may include a Load Duration Curve (LDC) modeling algorithm—an industry standard approach to estimate dispatch from electricity generation units (herein referred to as EGUs). The dispatch routine estimates electricity generation from each EGU so as to satisfy electricity demand described by load duration curves. A least-cost approach is employed by ranking to dispatch individual EGUs in the ranked order of their marginal operating cost. Electricity demand is defined by the LDC "load shape". As shown in FIG. 2, load shapes in the modeling system 2 may be characterized using a polynomial spline. In the FIG. 2 example, the spline consists of a second-order polynomial describing peak hours and a first order polynomial (aka straight line) defining the off-hours segment. A load shape is typically characterized from historic demand data FIG. 2 illustrates an exemplary peak season LDC characterization model 10 utilizing a 2-segment polynomial spline. Peak season may be defined as May 1 to September 30. The x-axis 12 represents the peak season LDC hour 14 while the y-axis 16 represents electricity demand 18, which may be displayed in megawatt units. The LDC characterization model 10 may be divided into a peak hours segment 19 and a off-peak hours segment 21. A peak season load shape 23 for the peak hours segment 19 of the LDC characterization model 10 may be characterized via a second order polynomial 25. The peak season load shape for 23 for the off-peak hours segment 21 of the LDC characterization model 10 may be characterized via a first order polynomial 27. The peak season load shape 23 may be characterized from historical demand data. Electricity demand 18 may be defined by the peak season load shapes 23 and may either be generically adjusted to reflect variable growth rate assumptions, or may be set more precise, pre-established load shapes unique to each future year.

A single LDC solution is a simple approach that limits the region of study and neglects the impact of regional markets, which may influence the performance of individual EGUS. In order to consider the influence of regional markets, a two-system LDC approach to was the basis of Oak Ridge National Laboratory's (ORNL) ORCED model and used for numerous studies on the simulation of operations and costs of bulk power markets.

Figure 3A:
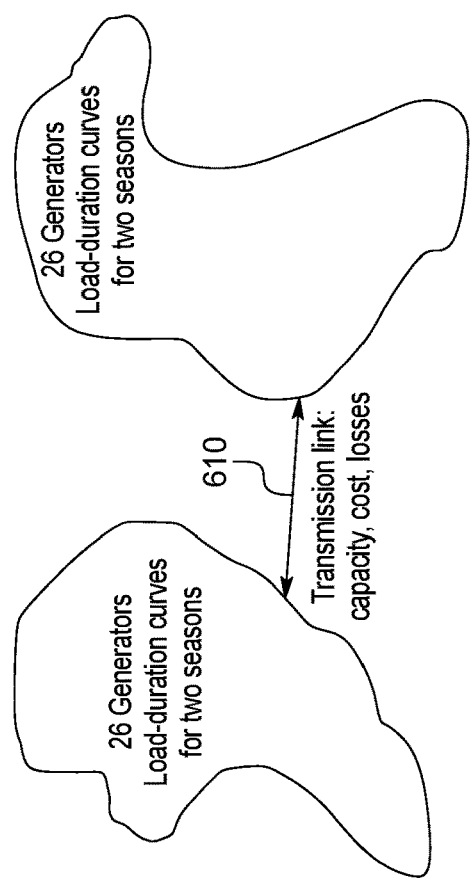
FIG. 3A illustrates the ORCED two-system LDC model.

FIGS. 3A and 3B illustrates an ORCED model 600 of a two-system LDC modeling approach of comparable size in FIG. 3A and the two-system approach of the modeling system 2 in FIG. 3B. which designates a local system and larger regional system. Both approaches define a single transmission link, the single tie 610, which transfers power between the two systems. A tie represents aggregate transmission capacity "bandwidth" by which the local and regional system may exchange power).

Figure 4:
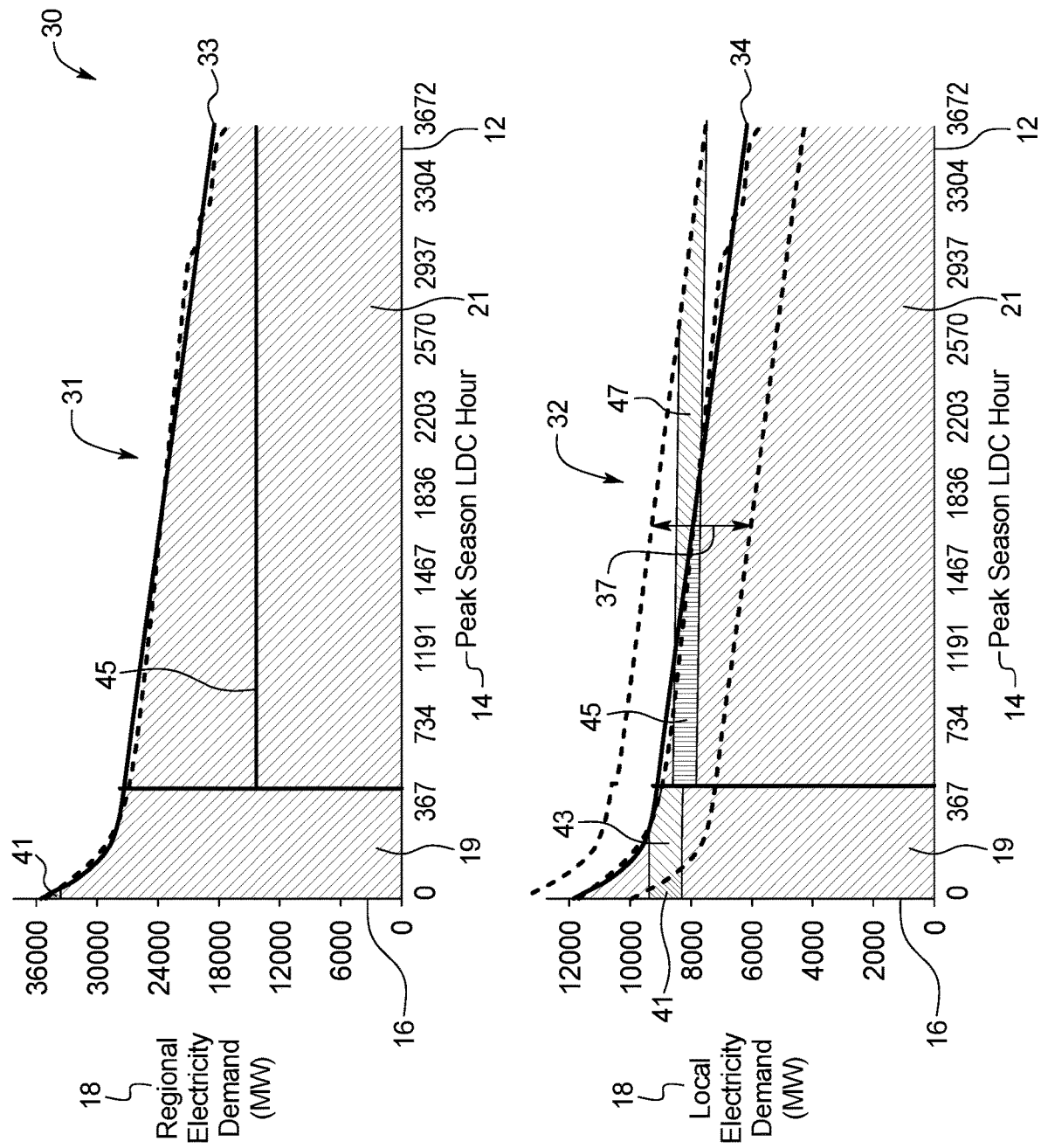
FIG. 4 shows a conceptual illustration of a two-system single-tie LDC modeling technique.

FIG. 4 shows a conceptual illustration of the dispatch calculation for a two-system single-tie LDC modeling technique 30. The top of FIG. 2 displays a regional LDC characterization model 31 and the bottom of FIG. 4 displays a local LDC characterization model 32.

The regional LDC characterization model 31 may include the x-axis 12, which may represent the peak season LDC hour 14 while the y-axis 16 may represent electricity demand 18, which may be displayed in megawatt units. The regional LDC characterization model 31 may be divided into the peak hours segment 19 and the off-peak hours segment 21. A regional peak season load shape 33 is shown for comparison.

The local LDC characterization model 32 may include the x-axis 12, which may represent the peak season LDC hour 14 while the y-axis 16 may represent electricity demand 18, which may be displayed in megawatt units. The local LDC characterization model 32 may be divided into the peak hours segment 19 and the off-peak hours segment 21. A local peak season load shape 34 is also shown.

In an embodiment, a local LDC characterization model 32 and a regional LDC characterization model 31 may be modeled as interconnected systems so as to estimate the interaction between a local power systems and a regional electric system via a single tie 610, wherein the tie 610 represents aggregate transmission bandwidth 37 by which the local and regional system may exchange power. Referring still to FIG. 4, the regional load shape, with a maximum demand of 36,000 MW, is illustrated at the top. The vertical line divides the peak season shape into two seasons, each of which are solved discretely. The regional system is first solved as an unconstrained single system ignoring the STC transmission constraint). The local load shape, with a maximum demand of 12,000 MW (illustrated at the bottom of FIG. 3) is subsequently solved with consideration of the transmission-constrained tie 610 between the two systems.

The single tie 610 between the local LDC characterization model 32 and regional LDC characterization model 31 may be expressed as megawatts of transfer capacity. The "bandwidth" constrains the capacity of power that may move into or out of the external market, the magnitude of which may vary for each LDC segment. For each segment, the regional simulation establishes the extent to which a local generating unit is market-competitive. Each generating unit operating on margin may have its contribution to local loads curtailed, if it more expensive than competing regional generators, or may export surplus generation, if less expensive than competing regional generators. The maximum extent to which a unit may be curtailed or provide surplus is constrained by the transmission bandwidth between the two systems.

A region 41 in the regional LDC characterization model 31 and local LDC characterization model 32 represents a less competitive unit, relative to the market, during the peak hours segment 19. A region 43 in the local LDC characterization model 32 represents displacement by market power. A region 45 in the regional LDC characterization model 31 and local LDC characterization model 32 is a highly competitive unit during the off-peak hours segment 21. A region 47 in the local LDC characterization model 32 represents surplus market sales that are constrained slightly by the limited transmission bandwidth 37.

Figure 5:
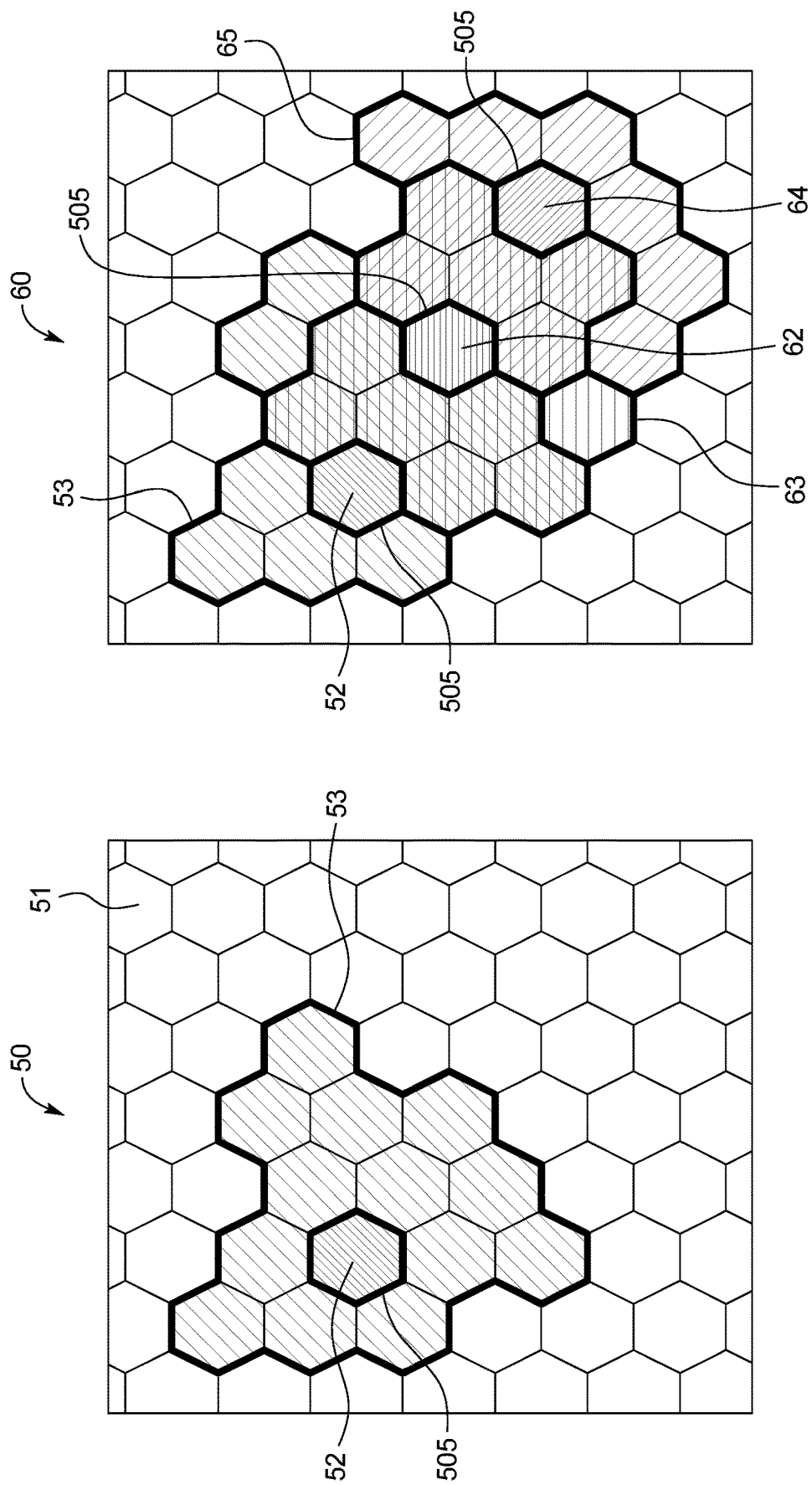
FIG. 5 shows a networked-LDC modeling approach utilized by the system.

FIG. 5 illustrates an exemplary networked-LDC approach. A networked-LDC approach allows for a high granularity simulation that is not limited in geographic scale. The local utility system diagram 51 includes a local node 52, which is surrounded by a regional system 53. Each hexagon represents a discreet local node surrounded by, and interacting with, a larger regional system. The networked-LDC diagram 60 illustrates this networking from the perspective of three local nodes (out of many nodes shown). Local node 52 is networked to thirteen other nodes, including node 62, but not node 64. Local node 62 is surrounded by the regional system 63, which includes nodes 52 and 64.

Referring back to FIG. 5, illustrated is a two-system LDC solution that may be expanded into the more flexible and expandable multi-nodal LDC solution that supports multi-userism. In the networked-LDC approach of FIG. 5, at left, a smaller local node 52 of the nodes 505 of a collection 560 is surrounded by a second regional system 53. At right, the modeling system 2 networks each local node 52 and accounts for regional transactions. Each hexagon represents a node 505 that is individually simulated as a discrete local system with unique region.

For each node 505, the modeling system 2 simulates dispatch using a single instance of the two-system LDC modeling approach described in FIG. 3. Each hexagon represents a node 505 of the energy system. At left in FIG. 4, the modeling system 2 treats the "yolk" as the local node 52 (FIG. 4 bottom) and the "white" as the regional system 53 (FIG. 4 top). The modeling system 2 makes a multi-nodal power system possible. The regional power system 53 no longer needs to be a singularly defined construct. Instead, it's defined flexibly for every node 505, representing an aggregation of any number of neighboring nodes 505. The modeling system 2 "quilts" these many local-regional couples into scalable regional or national multi-user simulations.

The networked-LDC modeling approach of the present disclosure creates large-scale power-sector simulations that allow for many "utility-scale" simulations to be scaled up to national scale without sacrificing granularity. In this way, the modeling system 2 provides a practical solution to known scaling/granularity problem in national energy modeling.

Figure 31:
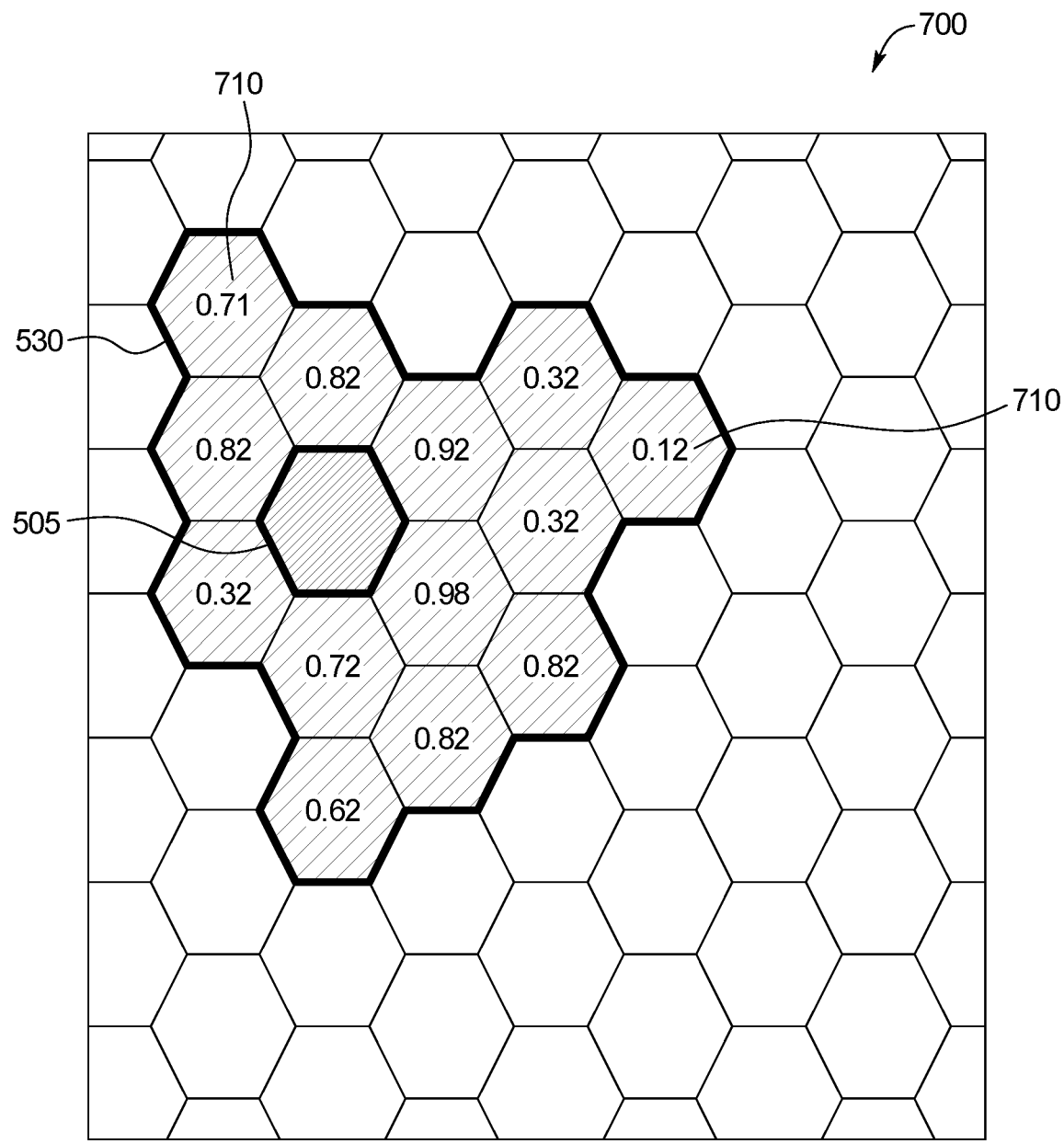
FIG. 31 illustrates an example of de-rating weighting factors applied to a multi-nodal model to account for geographic heterogeneity of the transmission system's power flow.

The multi-nodal approach also creates new ways to account for the heterogeneity of the transmission system. Power cannot flow between all places uniformly, due to operational constraints of the power lines—creating pockets of constrained transmission. This is reflected in operating power markets through the consideration of Locational Marginal Pricing. This allows for unique clearing prices in zones where transmission constraint restricts access to lower cost power. These operational realities can be mimicked by giving a heterogeneous weighting to each of the nodes (and/or some or all of the EGUs within those nodes), reflecting areas of higher and lower market access. FIG. 31 illustrates an example of de-rating weighting factors 710 applied to a multi-nodal model to account for geographic heterogeneity of the transmission system's power flow. As a standard practice in LDC modeling, the available capacity of each generating unit is derated to reflect limits in generation from planned and forced outages. In a multi-nodal system, de-rating can also be applied geographically, corresponding to the transmissions systems ability to move power from the surrounding region to the local node 505. In FIG. 31, the weighting factors 710 shown would be applied as a secondary multiplier to the derating used when the regional LDC dispatch is performed (lower half of FIG. 3). In this illustration, transmission constraints are assumed to restrict power flow between the local node 505 and the adjacent node to the south-west. To reflect this, the ability of local generating units to meet load would be reduced to only 32% of their otherwise rated capacity. (The regional load shape must similarly be constructed to reflect the same de-ratings.) In comparable long-term power sector models, transmission constraint is either neglected, or treated as singular "pipe flows" between one or more regions. The multi-nodal approach offers much more flexibility in its ability to reflect geographic differences in power flow, from the perspective of each node 505, relative to its neighbors.

Figure 6:
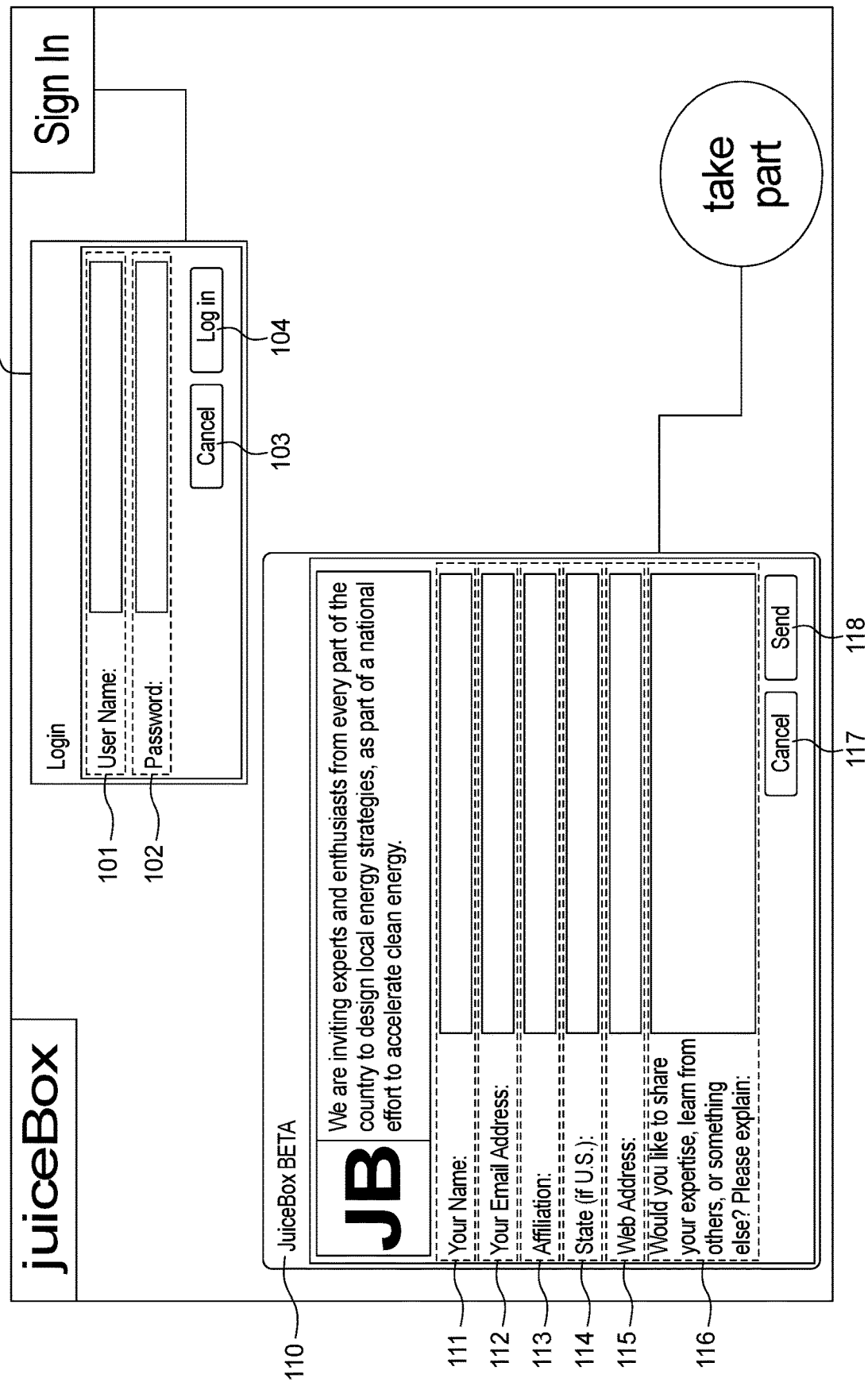
FIG. 6 shows an exemplary user interface for logging into the software platform of FIG. 1.

FIG. 6 illustrates exemplary forms to create an account for the software platform and to login to a user's account. The login form 100 may include a user name input area 101, wherein the user inputs their user name, and a password input area 102, wherein the user inputs their password. The user may submit their login request by selecting a "Log In" button 104. Additionally, the user may cancel their request by selecting a login "Cancel" button 103.

A membership request form 110 allows a user to create an account in order to become a member and use the software platform. The membership request form 110 may include a name input area 111, an email address input area 112, an affiliation input area 113, a state input area 114, a web address input area 115, and additional details input area 116. The user may input their name into the name input area 111 and their email address into the email address input area 112. The user may input their affiliation (e.g. university, company) into the affiliation input area 113 a web address into the web address input area 115. The web address may be a personal website of the user. In the additional details input area 116, the user may input information such as an expertise. Upon completing the membership request form 110, the user may submit the form be selecting a send button 118. The user may also cancel their request be selecting a membership request "Cancel" button 117.

Figure 7:
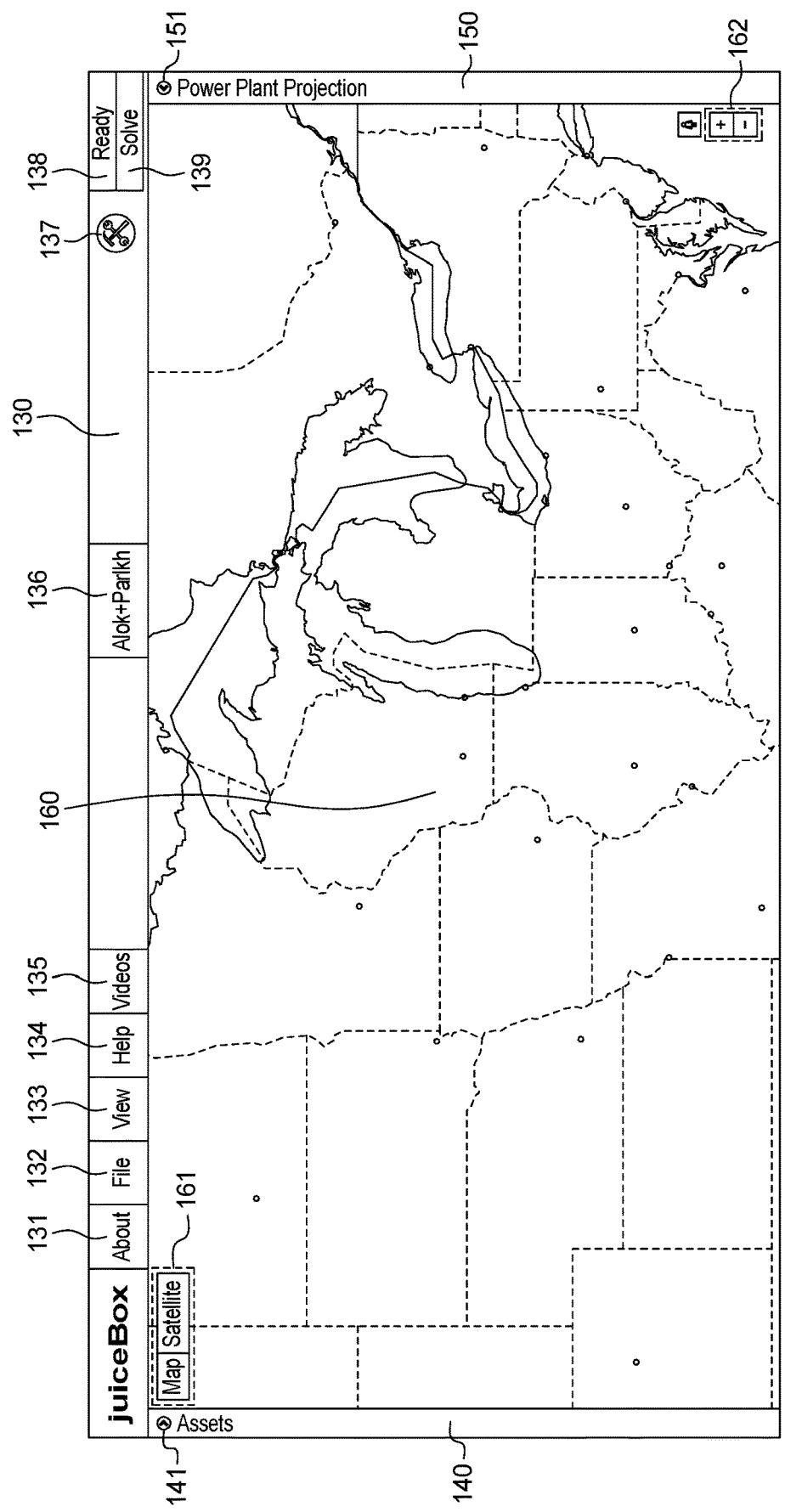
FIG. 7 shows an exemplary user interface for the software platform of FIG. 1.

FIG. 7 illustrates an exemplary user interface that user may encounter upon logging into the software platform via the login form 110. The user interface may include a top bar 130, an expandable "assets" tab 140, and an expandable "power plant projection" tab 150.

The top bar 130 may include an "about" button 131, a "file" button 132, a "view" button 133, a "help" button 134, a "videos" button 135, an "account" button 136, and "build an EGU" icon 137.

The "about" button 131, when selected by the user, may display a window that provides details about the software platform, including version information, copyright information, and trademark information. The "file" button 132, when selected (i.e. clicked) by the user, may display a dropdown menu from which the user may select a particular activity to perform, including, load a plan, save a plan, share a plan, load a scenario, save a scenario, share a scenario, save energy generating units (EGU) results, and perform a tree test. The "view" button 133, when selected by the user, may display a dropdown menu from which the user may select a particular data set to view, including, system forecast, generating units, instructions, fuel prices, and other variables. The "help" button 134, when selected by the user, may display a dropdown menu from which the user may select a particular topic list of topics related to the use of the software platform. The "video" button 135, when selected by the user, may display a dropdown menu from which the user may select a particular video, which is related to the software platform, to watch.

The "settings" button 136, when selected by the user, may display a dropdown menu from which the user may select a particular activity to perform, such as setting preferences, managing their account, and logging out of the software platform. The "build an EGU" icon 137, when selected by the user, open a new window from which the user may build a new energy generating unit (i.e. power plant) and place it into a plan. The "build an EGU" icon 137 may only be active, and thus selectable, after the user loads a plan (see FIG. 20).

Additionally, the top bar 130 may include a "status" display area 138 and "solve" button 139. The "status" display area may display the status of the software platform. For example, upon logging into the software platform, the "status" display area may display the text "Ready" meaning that the software platform is ready for use. The "solve" button 139, when selected by the user, may trigger the power sector model to calculate the performance of every power plant individually and in aggregate. The "solve" button 139 may only be active, and thus selectable, after the user loads a plan.

The user may expand the expandable "assets" tab 140 by selecting an "assets" expand/collapse icon 141. When expanded, the "assets" tab 140 allows the user to view and load their saved plans and scenarios along with any group plans and scenarios (see FIG. 13). The user may collapse the expandable "assets" tab 140 by selecting the "assets" expand/collapse icon 141.

The user may expand the expandable "power plant projection" tab 150 by selecting the "power plant projection" icon 151. When expanded, the "power plant projection" tab displays information related to a particular power plant that the user has selected after loading a plan (see FIG. 15). The user may collapse the expandable "power plant projection" tab 150 by selecting the "assets" expand/collapse icon 151.

Additionally, the user interface may include a map 160. The map 160 may include a map type toggle switch 161, which allows the user to toggle the map between a "map" view and "satellite" view. The map 160 may also include a "zoom" area 162 that allows the user to zoom-in and zoom-out their view of the map.

Figure 8:
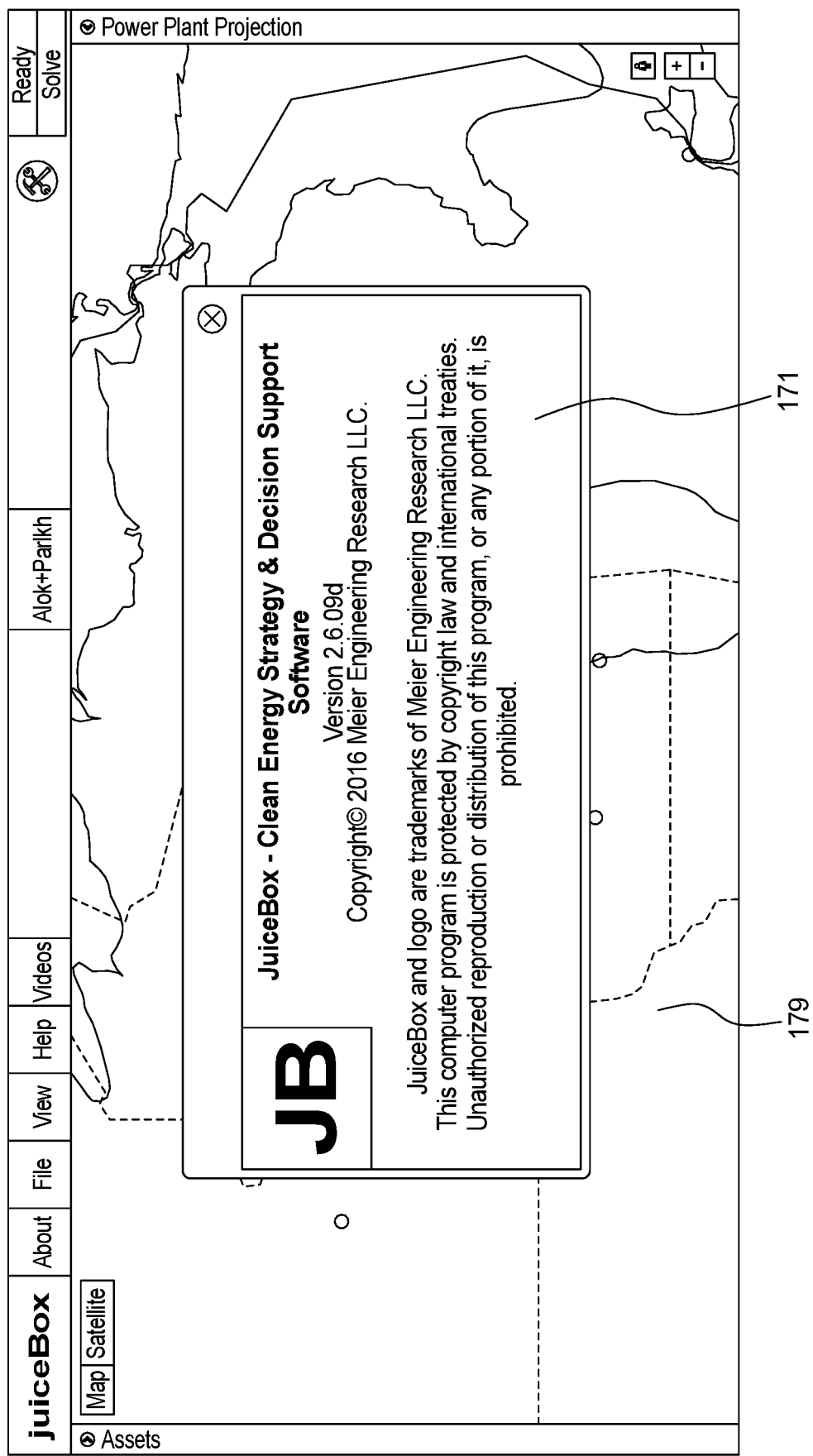
FIG. 8 shows an exemplary user interface for the software platform of FIG. 1 displaying a window describing the software platform.

FIG. 8 illustrates an exemplary user interface after the user selects the "about" button 131. Upon selecting the "about" button 131, the user interface may display an "about" window 171 that provides details about the software platform, including software version, copyright information, and trademark information. Additionally, the background window 169 of the user interface may become in inactive and appear faded. The user may close the "about" window 171 by selecting an "x" icon 165, which may be located in the upper left hand corner of the "about" window 171. Upon closing the "about" window 171, the background window 179 may become active and no longer appear faded.

Figure 9:
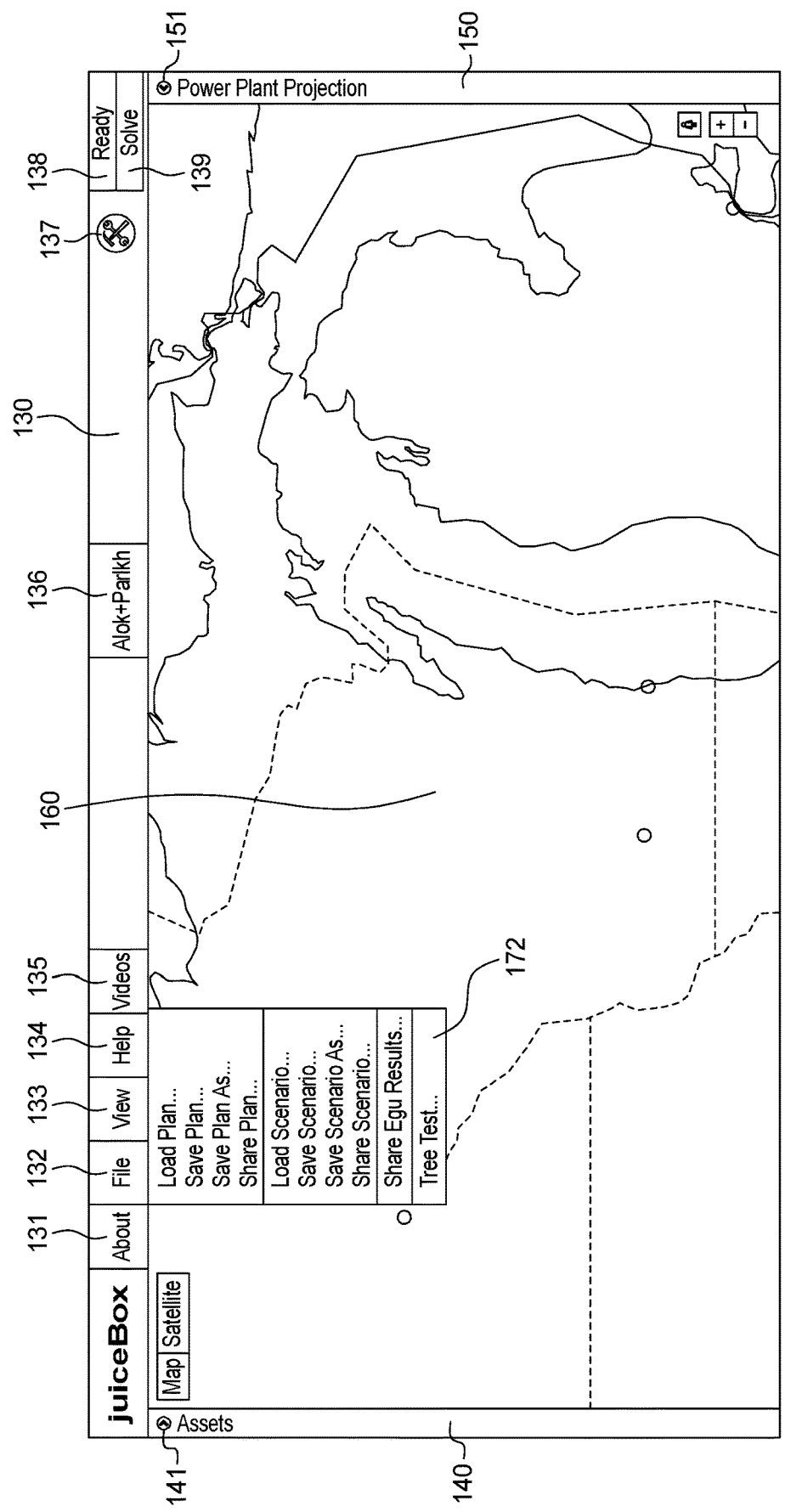
FIG. 9 shows an exemplary user interface for the software platform of FIG. 1 displaying a expanded "file" dropdown menu

FIG. 9 illustrates an exemplary user interface after the user selects the "file" box 132. Upon selecting the "file" box 132, a "file" dropdown menu 172 is displayed. The "file" dropdown menu 172 may list activities the user may perform by selecting a particular activity. Activities may include load a plan, save a plan, share a plan, load a scenario, save a scenario, share a scenario, save energy generating units (EGU) results, and perform a tree test. In order to perform an activity, the user must select that particular activity.

Figure 10:
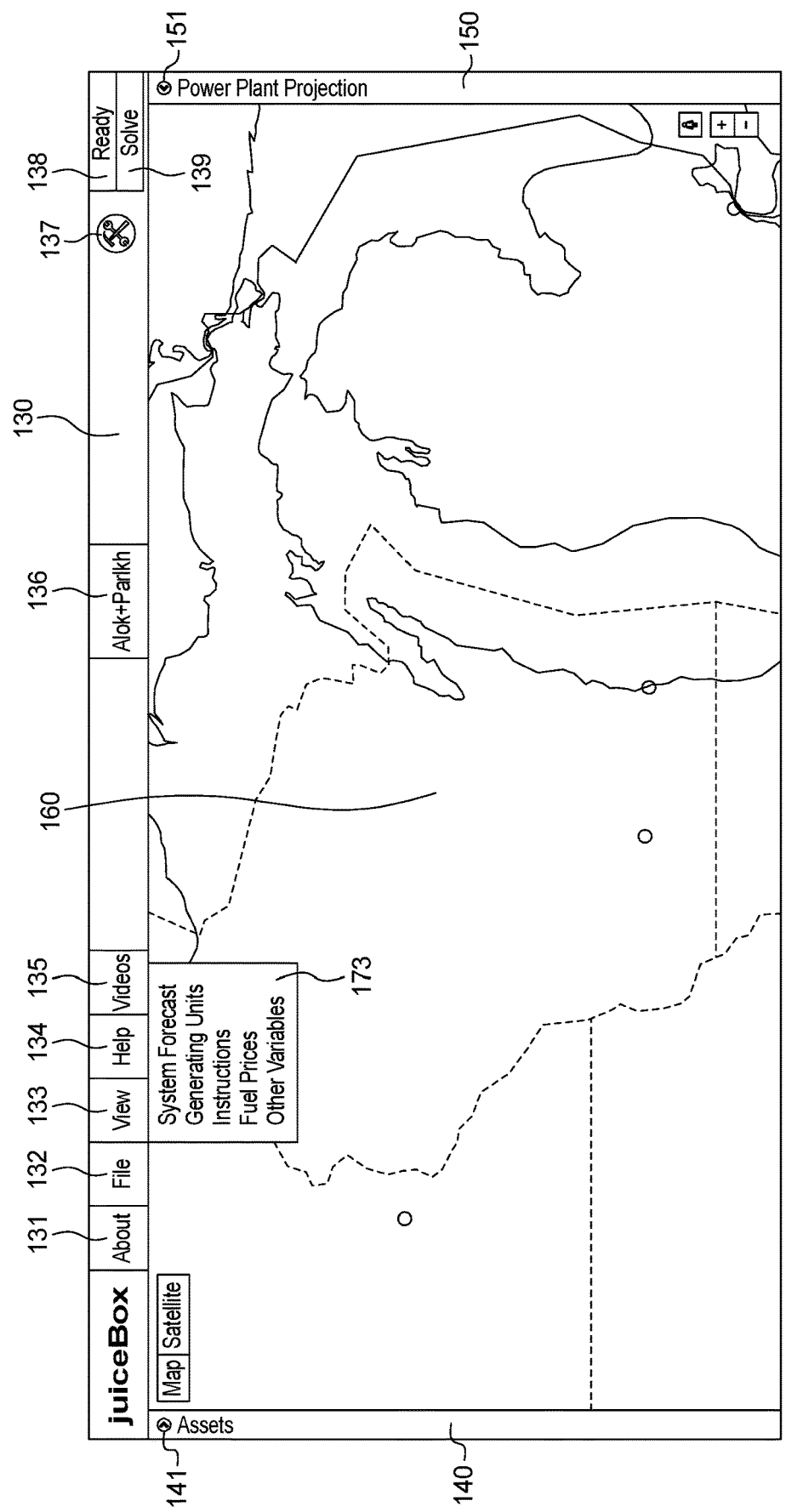
FIG. 10 shows an exemplary user interface for the software platform of FIG. 1 displaying a expanded "view" dropdown menu

FIG. 10 illustrates an exemplary user interface after the user selects the "view" button 133. Upon selecting the "view" button 133, a "view" dropdown menu 173 is displayed. The "view" dropdown menu 173 may provide a list of information sets or datasets the user may view, including a system forecast, generating units, instructions, fuel prices, and other variables. Upon selection of a specific information set or dataset, a separate window may open and display the information set or dataset the user selected. In order for these windows to display information, the user must first load a plan via the "file" dropdown menu 172.

Figure 11:
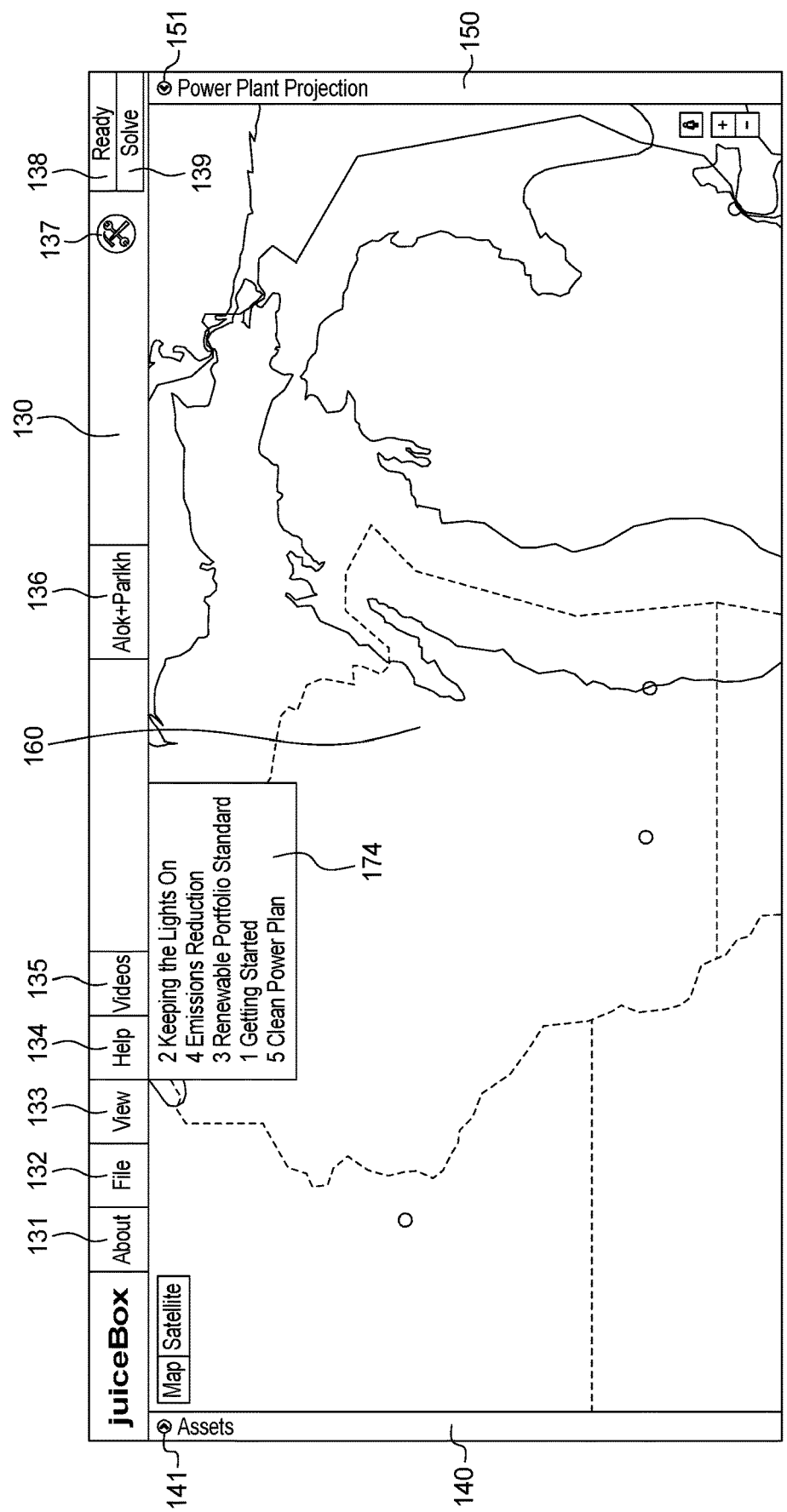
FIG. 11 shows an exemplary user interface for the software platform of FIG. 1 displaying a expanded "help" dropdown menu

FIG. 11 illustrates an exemplary user interface after the user selects the "help" button 134. Upon selecting the "help" button 134, a "help" dropdown menu 174 may be displayed. The "help" dropdown menu 174 may provide the user with a list of topics for which the software platform may provide help and support. Upon selection of a topic, a separate window may open and display helpful information (e.g. text, video) that relate to the user's selected topic.

Figure 12:
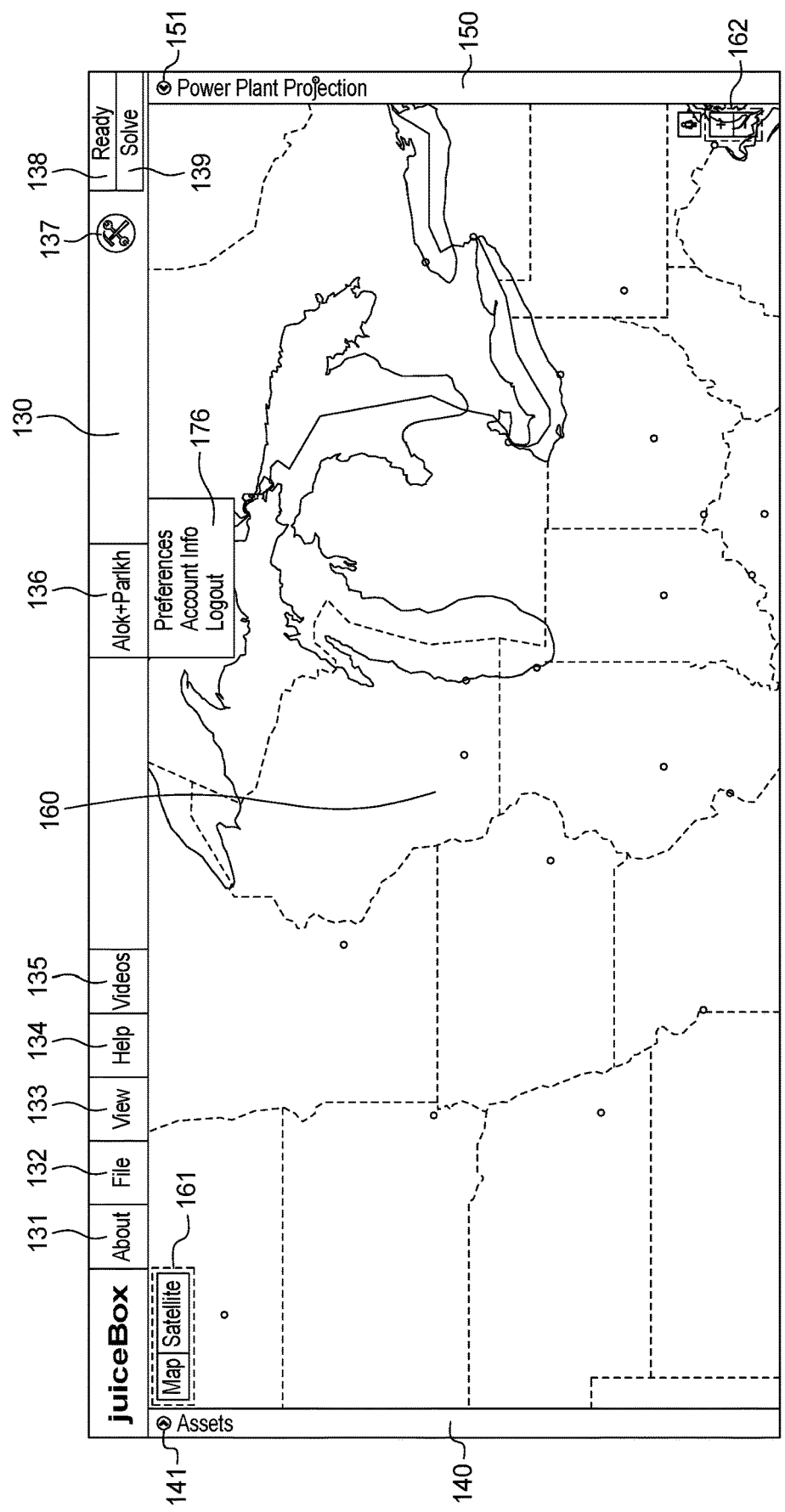
FIG. 12 shows an exemplary user interface for the software platform of FIG. 1 displaying a expanded "settings" dropdown menu

FIG. 12 illustrates an exemplary user interface after the user selects the "settings" button 136. Upon selecting the "settings" button 136, a "settings" dropdown menu 176 may be displayed. The "settings" dropdown menu 176 may provide the user with list of actions to manage their account. The activities may include, setting preferences, viewing their account information (e.g. password, email address, phone number), and logging out of the software platform. The software platform gives the user to set certain preferences, including graph colors, graph bar opacity, and graph number size.

Figure 13:
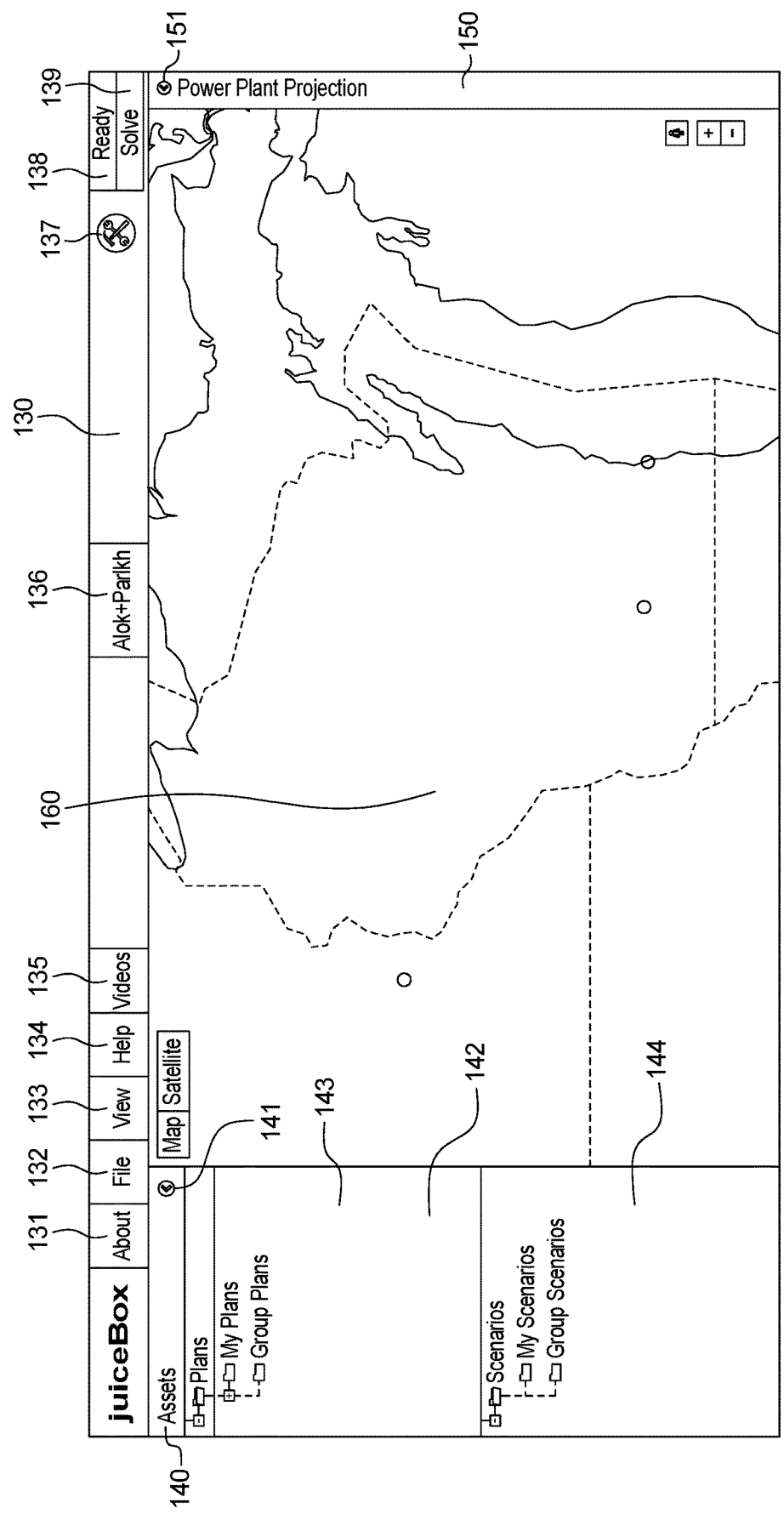
FIG. 13 shows an exemplary user interface for the software platform of FIG. 1 displaying an expanded "assets" sidebar.

FIG. 13 illustrates an exemplary user interface after the user expands the expandable "assets" tab 140. Upon expanding the "assets" tab 140, via the "assets" expand/collapse icon 141, the "assets" window 142 may appear. The "assets" window 142 may include a "plans" area 143 from which the user may load their saved plans along with group plans and a "scenario" area 144 from which the user may load their saved scenarios along with group scenarios. A scenario defines the variables, while instructions define changes to the system. In an embodiment, a plan is a combination of scenarios and instructions. The user may close the "assets" window 142 by collapsing the expandable "assets" tab 140 via the "assets" expand/collapse icon 141.

Figure 14:
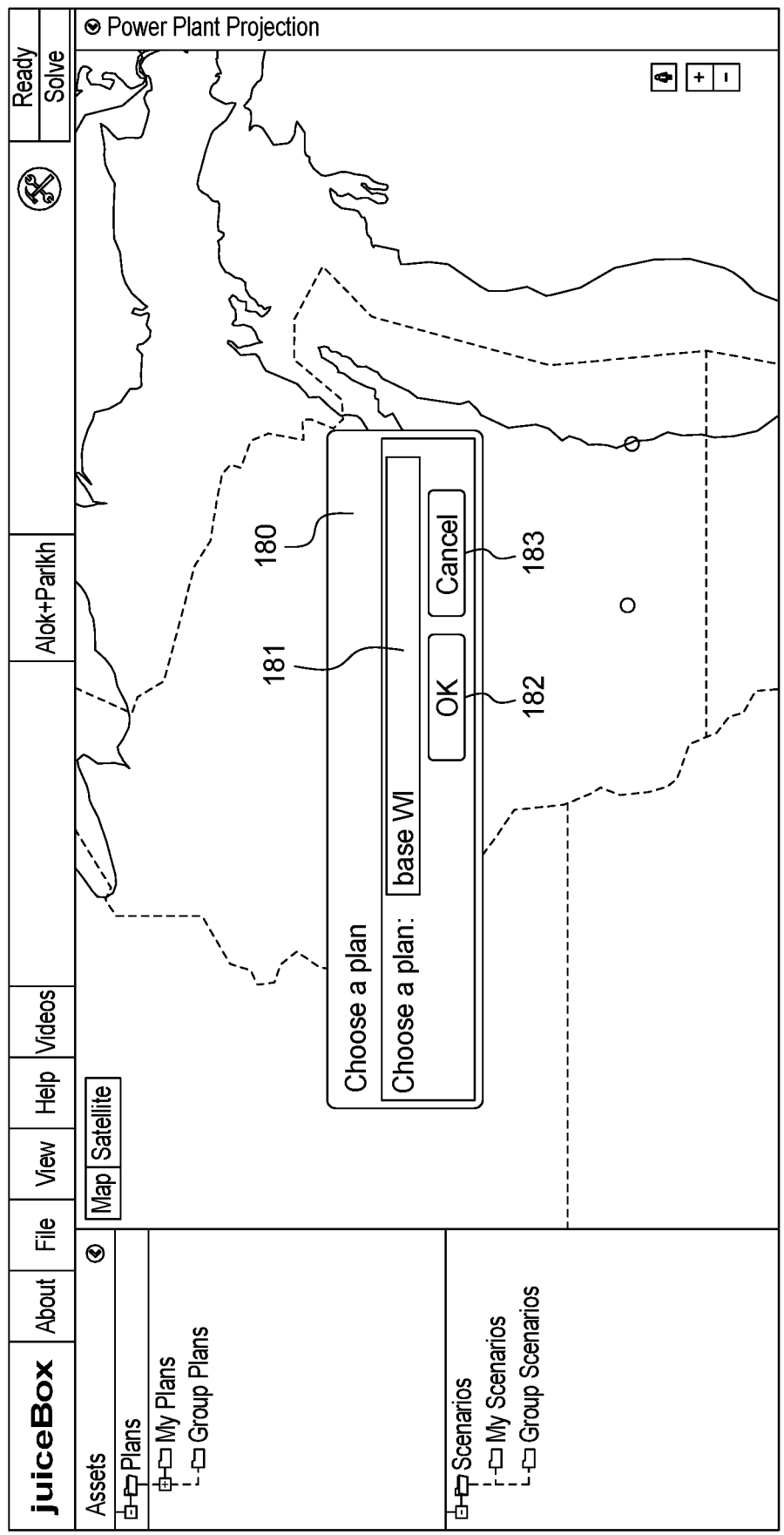
FIG. 14 shows an exemplary user interface for the software platform of FIG. 1 displaying a window used to load a plan.

FIG. 14 illustrates an exemplary user interface after the user selects the "file" button 132 and then selects the option to load a plan. Upon selecting the option to load a plan, a "choose a plan" window 180 may appear. The "choose a plan" window 180 may include a "choose a plan" dropdown menu 181, which may list all of the plans the user has available that may be loaded by the software platform. Further, the "choose a plan" window 180 may include an "ok" button 182 and "cancel" button 183. Upon selecting a plan to load, the user may select the "ok" button 182 to load the plan. If the user selects the "cancel" button 183, the "choose a plan" window 180 may close and no plan will be loaded.

Figure 15:
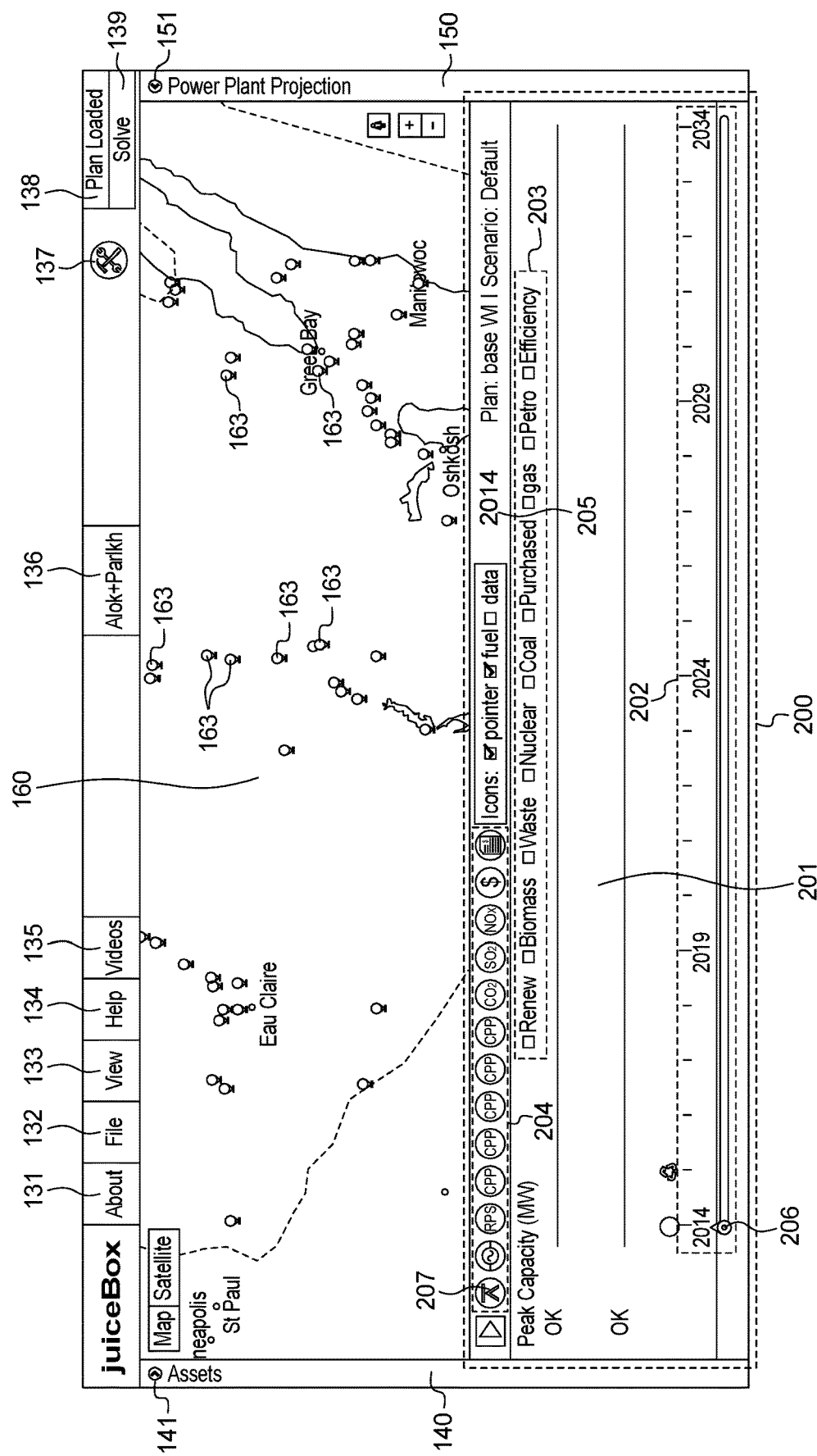
FIG. 15 shows an exemplary user interface for the software platform of FIG. 1 after an energy plan is loaded.

FIG. 15 illustrates the user interface after the user has loaded a plan via the "chose a plan window" 160 (see FIG. 14), but not yet run a simulation via the selection of the "solve" button 139. The user interface may include the top bar 130, the expandable "asset" tab 140, the expandable "power plant projection" tab 150, the map 160, and a graph area 200.

The map area 141 may include one or more power plant icons 163. The power plant icons 163 may be a color that corresponds to the type of fuel used at the power plant. For example, power plants that utilize renewable energies, biomass, and waste may appear as different shades of green, nuclear power plants may appear as dark blue icons, coal power plants may appear as gray icons, natural gas power plants as light blue, and petrochemical as brown. Additionally, power plants from which the grid may purchase energy may appear as colored icon with an orange circle.

The graph area 200 may include a graph display area 201, an adjustable timeline 202, a legend 203, a graph selection pane 204, and a "year" display area 205. The graph display area 201 is the area in which a graph is displayed. The adjustable timeline 202 allows a user to move the slider 206 to a specific year. The adjustable timeline 202 may include the years of a planning horizon (e.g. from the year 2014 to the year 2034). The legend 203 defines which color corresponds to which type of fuel, along with any other colors that may appear in the power plant icons 163 or the graph.

The graph selection pane 204 may include one or more "graph" buttons 207, which each button representing a different graph. The user may select a specific graph button 207 to view that graph. The graph may appear in the graph display area 201. Graph selections may include variable graphs for various variables that may be forecasted by the modeling system 2. For example, variable graphs may include a peak capacity graph, an electricity generation graph, a RPS compliance graph, a generation cost graph, an average rate graph, at least one type Clean Power Plan graphs, and sulfur dioxide, nitrogen oxide, and carbon dioxide emission graphs. The peak capacity graph shows the available generating capacity relative to projected peak electricity demand. The RPS compliance graph shows contributions from renewable fuels. The generation cost graph shows total power plant costs, while the average rate graph shows the average cents per KW/H cost for generation, transmission, and distribution. The Clean Power Plan graphs show metrics for the EPA's Clean Power Plan Rule. In order for any graph to display, the user must first run a simulation via the selection of the "solve" button 139.

FIG. 15 illustrates an exemplary user interface after a user has loaded a plan and selected a particular power plant icon 163. After the user selects a power plant icon 163, the selected power plant icon 164 may appear with a special marking, such as a red circle, in order to distinguish it from non-selected power plant icons 163. Upon selecting the selected power plant icon 164, the "power plant projection" tab may automatically expand, thus displaying a "power plant projection window" 300. The "power plant projection" window 300 displays information relating to the selected power plant, but also allows the user to edit inputs.

Figure 16:
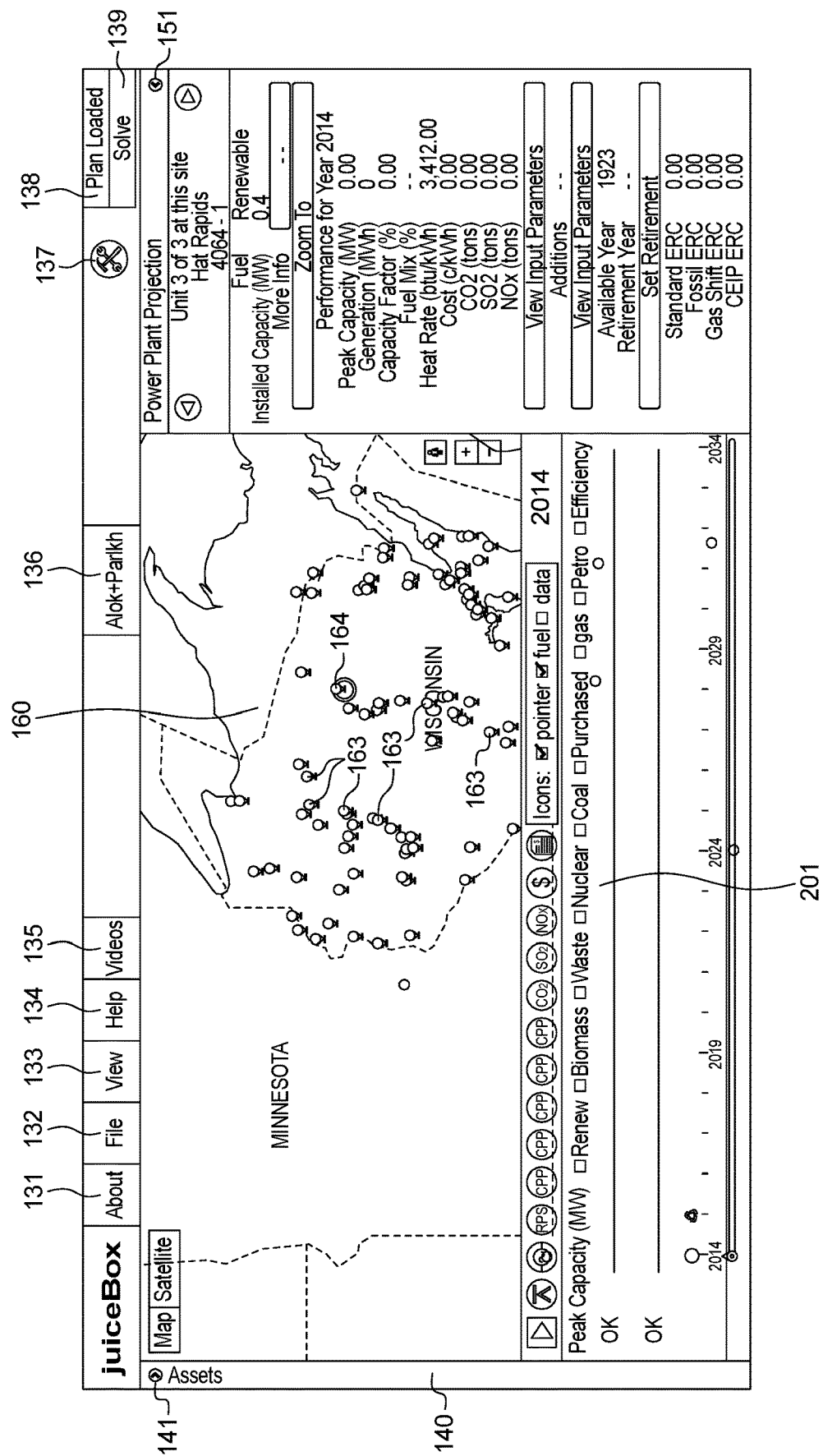
FIG. 16 shows an exemplary user interface for the software platform of FIG. 1 displaying a window to edit a power plant.

FIG. 16 is an exemplary user interface for the "power plant projection" window 300, which may include an information section 301, "parameters" section 310, "additions" section 330, "retirement" section" 350, and "emissions compliance" section 370.

The "information" section 301 provides general information about the selected power plant and the selected generating unit within that power plant. Information provided may include the name of the power plant, fuel type, and installed capacity. Additionally, in the event that the power plant has more than one generating unit, the "arrow" icons 302 may allow the user view information of the other generating units present at the selected power plant.

The "parameters" section 310 may provide parameters for one of the selected power plant's generating units, including peak capacity, generation, capacity factor, fuel mix, heat rate, cost, and carbon dioxide, sulfur dioxide, and nitrogen oxide emissions. The "parameters" section 310 may also provide the year for which the parameters apply. If the user desires to view and input parameters for another year, the user may change the year via the adjustable timeline 202. The "view input parameters" button 311, upon selection by the user, opens a "power plant editor" window 320 (see FIG. 17), which allows the user adjust certain input parameters.

The "additions" section 330 displays any additional air pollution control (APC) mechanisms the generating unit utilizes. The "install additions" button 331, upon selection by the user, may open an "install addition" window 340 (see FIG. 18).

The "retirement" section 350 provides year the generating unit became available for use and also the year the unit was retired (if applicable). A "set retirement" button 351, upon selection by the user, may open a "set retirement" window, from which the user may set a year in which to retire the generating unit.

FIG. 17 illustrates an exemplary user interface for the "power plant editor" window 320. The "power plant editor" window 320 may include a "unit info" tab 321, "location" tab 322, "specs" tab 323, "costs" tab 324, and "emissions" tab 325. Under the "unit info" tab 321, the user may change the unit name, unit address, respondent, and description. Under the "location" tab 322, the user may view and change the longitude and latitude of the generating unit's location. Under the "specs" tab 323, the user may view and change the unit's capacity, heat rate, and peak capacity factor. Under the "costs" tab 324, the user may view and change fuel price, capital cost, fixed operations and management costs, and variable operations and management costs.

Figure 18:
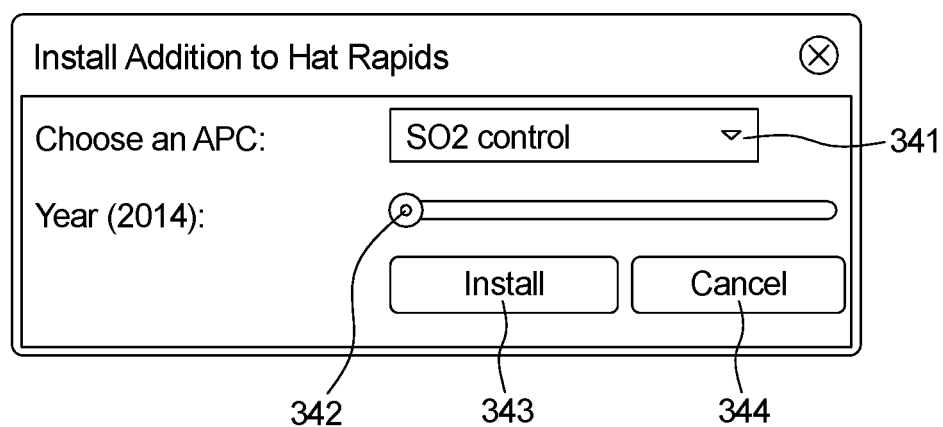
FIG. 18 shows an exemplary user interface for the software platform of FIG. 1 after an energy plan is simulated.

FIG. 18 illustrates an exemplary user interface for the "install additions" window 340. The "install additions" window 340 may include "choose an APC" dropdown menu 341 and an "implementation year" timeline slider 342. When selected, the "choose an APC" dropdown menu may list a variety of APC mechanisms, including sulfur dioxide controls, nitrogen oxide controls, sulfur dioxide and nitrogen oxide controls, 6% heat rate reduction, and 3% heat rate reduction. The "implementation year" timeline slider 342 allows the user to adjust the year the addition is implemented. In order to install the addition, the user may select an "install" button 343. If the user wishes to cancel the addition, they may select "cancel" button 344.

Figure 19:
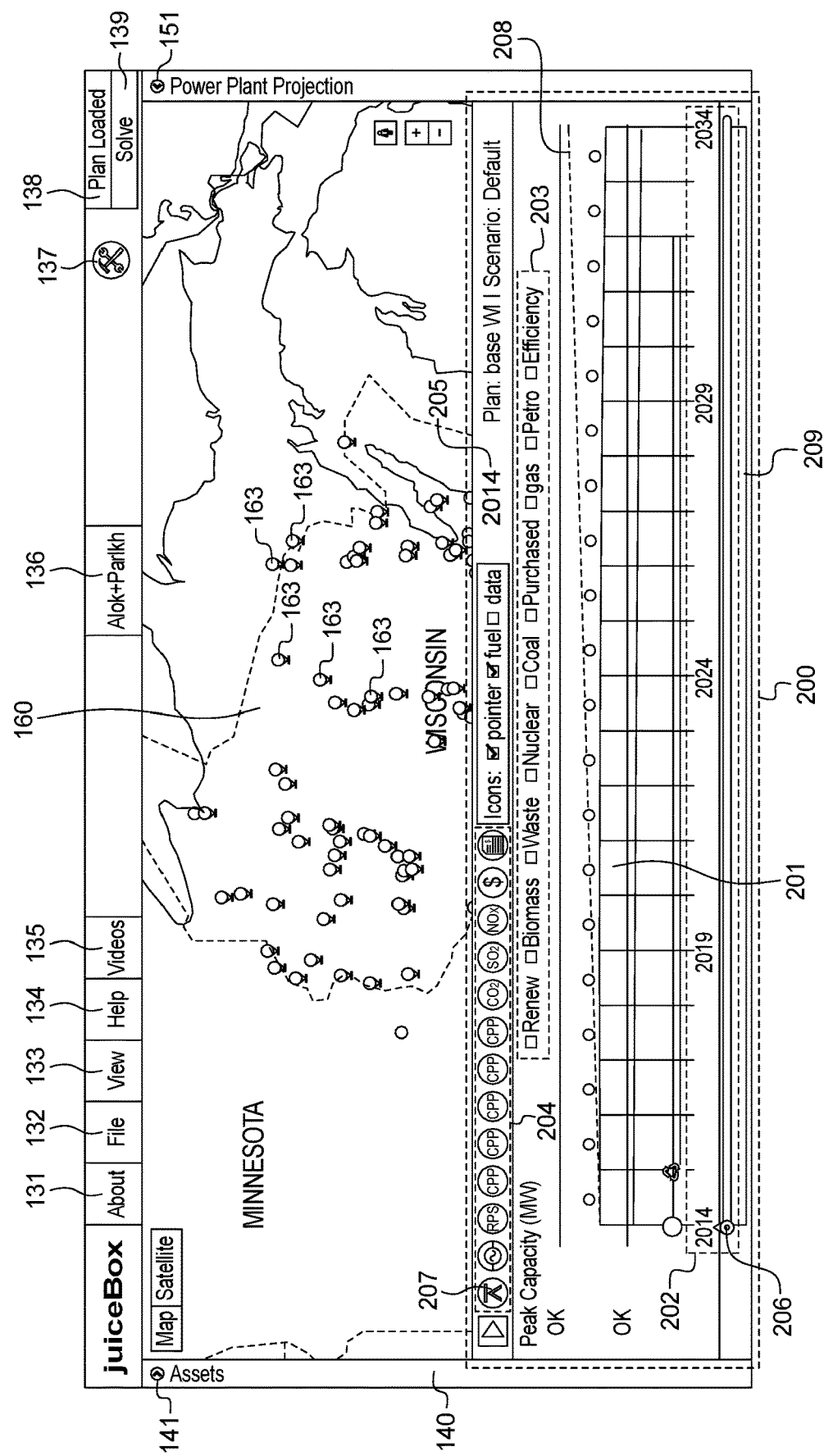
FIG. 19 shows an exemplary user interface for the software platform of FIG. 1 displaying window to build a new energy-generating unit.

FIG. 19 illustrates an exemplary user interface after the user had loaded a plan 510 and run a simulation via the selection of the "solve" button 139. In response to a user pressing the solve button 139, the modeling system 2 solves a regional dispatch for an aggregate regional load shape within the domain 530 to generate a forecast for the plan 510. After simulating a plan 510, the software platform may, by default, load the peak capacity graph in the graph display area 201. If the user desires to view a different graph, they may load a new graph by selecting one of the graph buttons 207. The various colors in each bar of the graph may represent fuel type, which are defined in the legend 203. Policy and planning objectives may be plotted by dashed lines 208. Compliance with these objectives may be indicated in red or green by the graph button 207 or the compliance bar 209, which may be located below the graph. The graph button 107 may be colored a first color, such as green, if the requirement has been satisfied, or a second color, such as red, if it has not. When viewing an individual graph, the compliance bar 209 along the timeline of the graph will change from green to red, indicating that the system fails to satisfy a planning target.

If a plan 510 fails to satisfy a planning target, the user may adjust the input variables via the "power plant editor" window 320 of FIG. 17 and/or install or adjust an APC mechanism via the "install additions" window 340. The user may then run the simulation again via the "solve" button 139. The user may continue to adjust inputs until the desired planning target is achieved.

Figure 20:
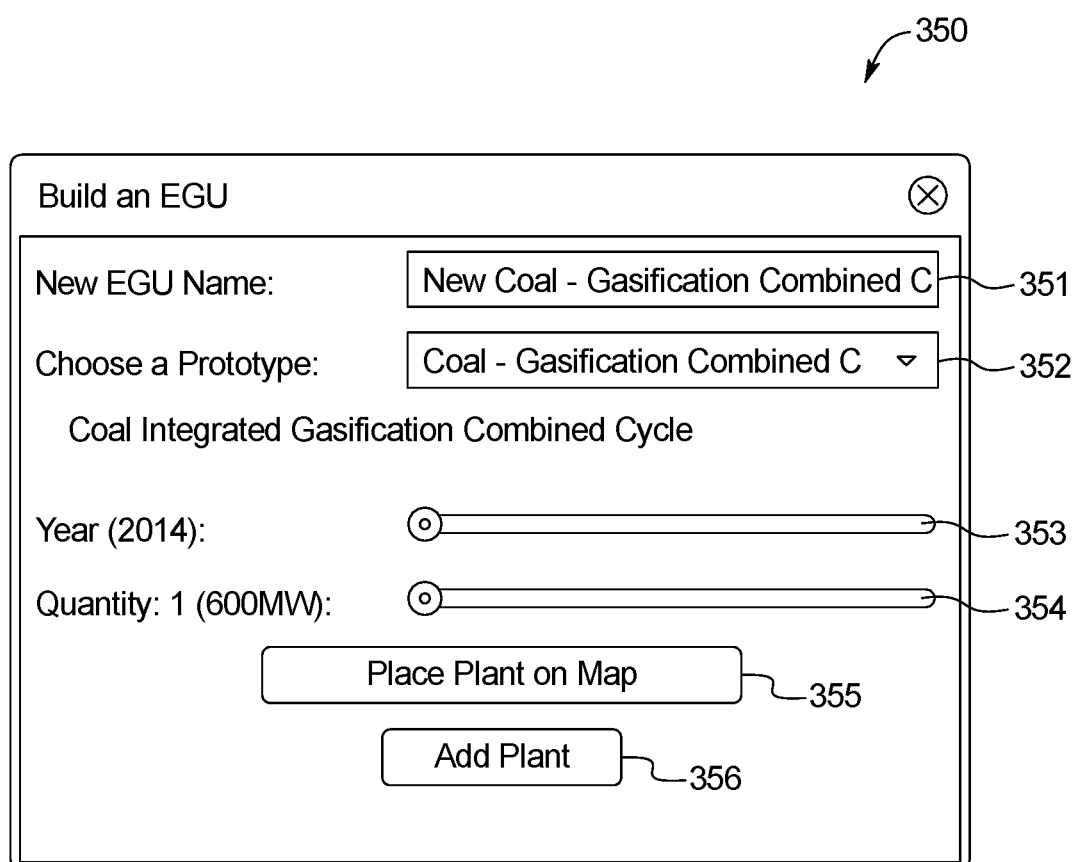
FIG. 20 shows an exemplary user interface for the software platform of FIG. 1 displaying a system forecast data table.

FIG. 20 illustrates an exemplary user interface for a "build an EGU" window 350, which the user may open by selecting the "build an EGU" icon 137. The "build an EGU" window 350 allows the user to add a new power plant to a plan and place it on the map and into the plan. The user may name the new EGU via the "new EGU name" input box 351 and chose a prototype via the "prototype" dropdown menu 352. Selectable generating unit prototypes may include various types of coal, diesel, fuel cell, natural gas, nuclear, and renewable units. A "year" input area 353 allows the user to define the year the plant will open. A "quantity" input area 354 allows the user to define the number of generating units the plant will incorporate. The user may place the power plant on the map via the "place plant on map button" 355 and add the power plant to the plan via the "add plant" button 356.

Figure 21:
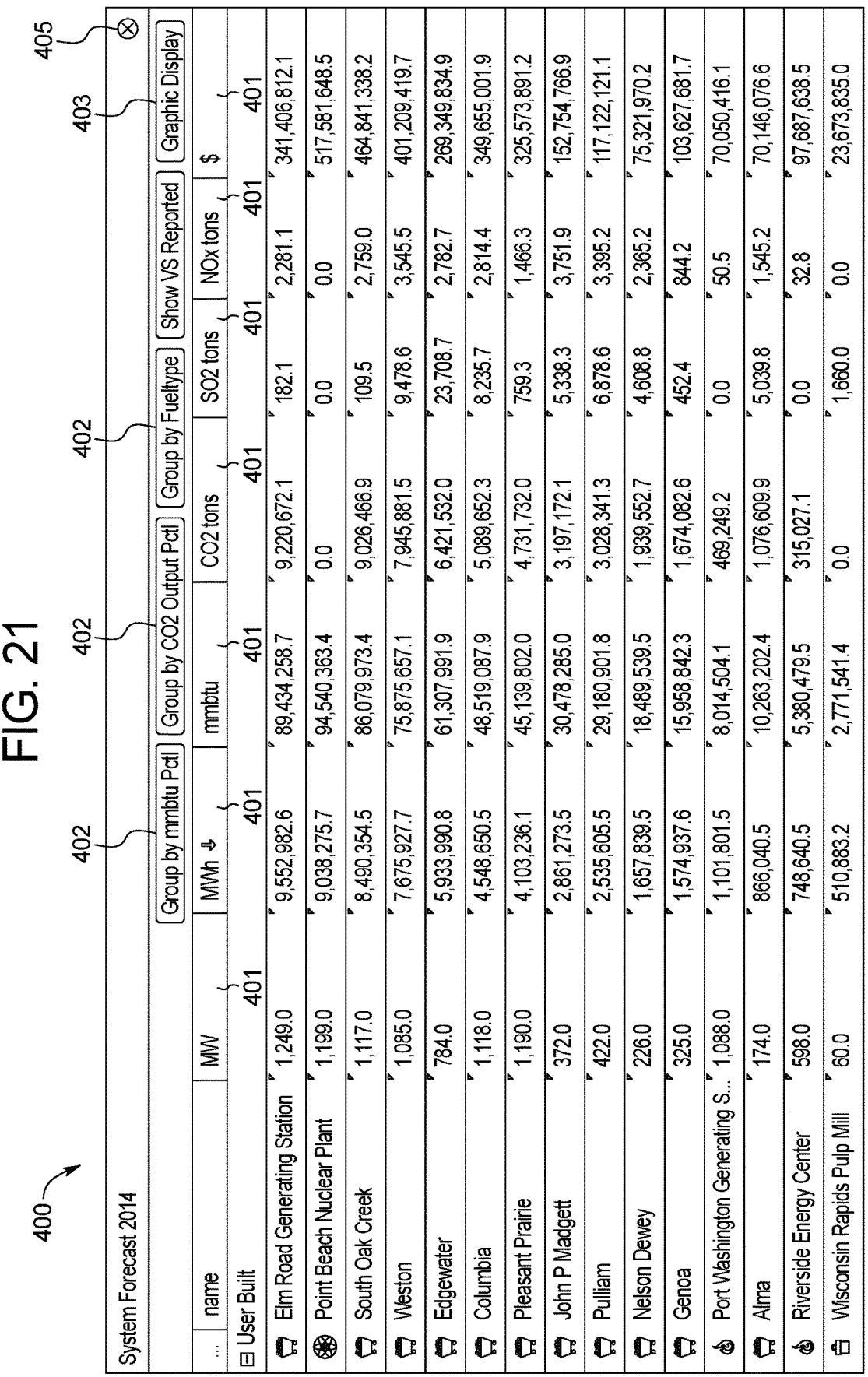
FIG. 21 shows an exemplary user interface for the software platform of FIG. 1 displaying a generating units data table.

FIG. 21 illustrates an exemplary user interface for a "system forecast" window, which the user may open by selecting the "System Forecast" option via the "view" dropdown menu 173. The "system forecast" window provides plant-by-plant summary chart, sortable by selecting one of the multiple column headers 401. The column headers may include, megawatts (MW), megawatt hours (MWh), one million British Thermal Units (mmbtu), carbon dioxide (CO2) tons, sulfur dioxide (SO2) tons, nitrogen oxide (NOx) tons, and cost. Additionally, the user may group the power plants according to various factors, including mmbtu percentile, CO2 output percentile, and fuel type. To group the power plants, the user may select a "group" button 402. Further, the user may view the data in graphical form by selecting the "graphic display" button 403. The user may close the "system forecast" window 400 by selecting a "x" icon 405.

FIG. 22 illustrates an exemplary user interface for a "generating units" window 410, which the user may open by selecting the "Generating Units" option via the "view" dropdown menu 173. The "generating units" window 410 provides a generating unit information chart, sortable by selecting one of the multiple column headers. The information presented may include each generating unit's id number, EDU ID, name, description, owner, address, ORIS, unit number, latitude, and longitude as column headers 401. The user may close the "generating units" window 410 by selecting the "x" icon 405.

FIG. 23 illustrates an exemplary user interface for an "instructions" window 410, which the user may open by selecting the "Instructions" option via the "view" dropdown menu 173. The "instructions" window 420 provides a sortable chart that lists all the selected plan's instructions, which define changes to the node 505, for each power plant. The column headers 401 for the instruction chart may include an ID number, the plan number, the year the instruction became or becomes active, a brief description of the instruction, the power plant's fuel type and the type of unit that is being added or removed. The "edit instruction" icon 421 allows a user to edit the instruction. The "delete instruction" icon 422 allows a user to delete an instruction. The user may close the "instructions" window 420 by selecting the "x" icon 405.

Figure 24:
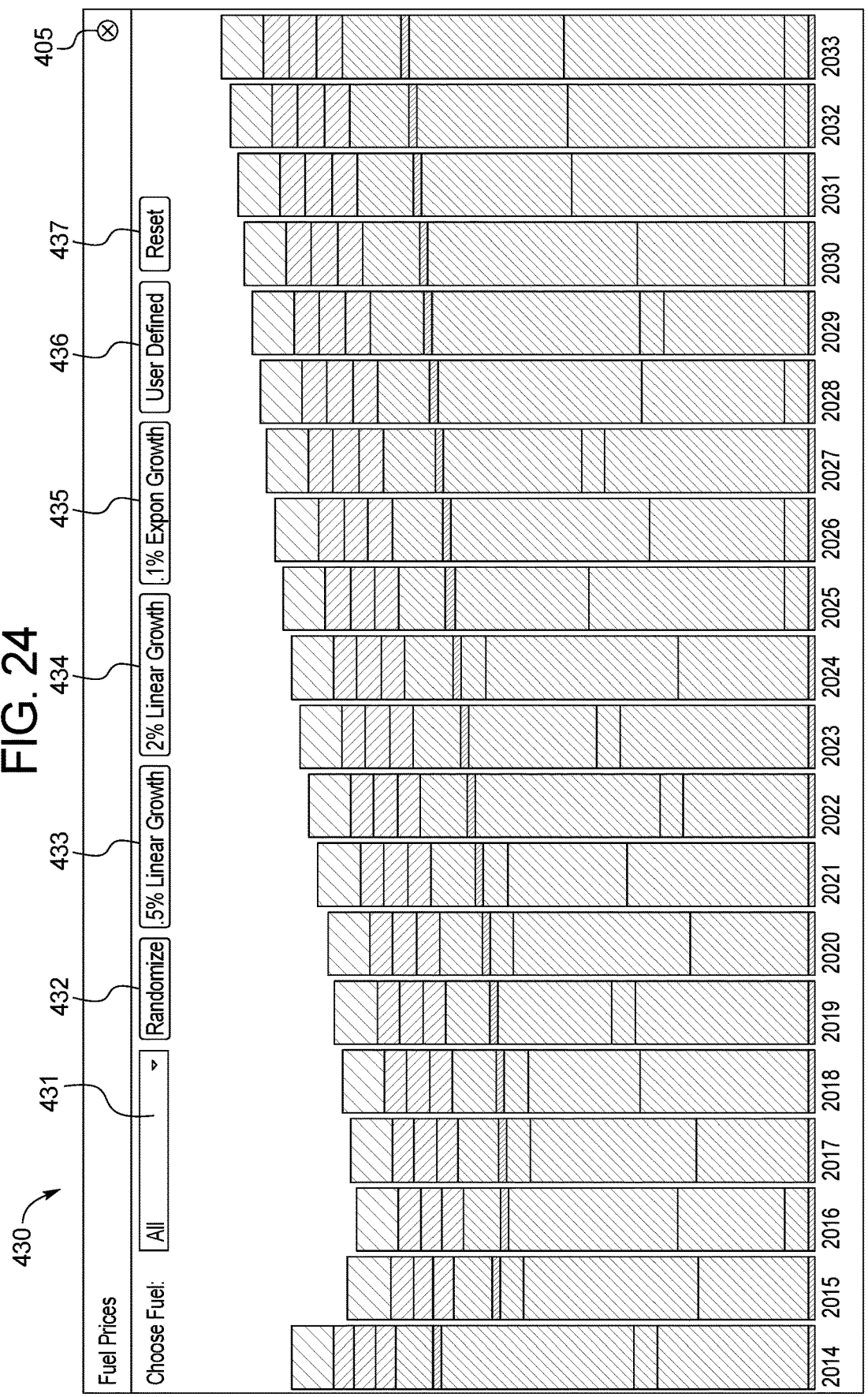
FIG. 24 shows an exemplary user interface for the software platform of FIG. 1 displaying a window to view and edit scenario variables.

FIG. 24 illustrates an exemplary user interface for a "fuel prices" window 430, which the user may open by selecting the "Fuel Prices" option via the "view" dropdown menu 173. The "fuel prices" window 430 provides a graph that displays yearly fuel prices. The colors in each bar may correlate to fuel type. A "fuel type" dropdown menu 431 allows the user to view fuel prices for all fuels, or a specific type of fuel. Some options included in the "fuel type" dropdown menu may include diesel, biomass, natural gas, coal waste, nuclear fuel, coal bit, and fossil waste. A "randomize" button 432 allows the user to randomize fuel prices. The user may apply a 0.5% linear growth rate by selecting the "0.5% linear growth" button 433, a 2% linear growth rate by selecting the "2% linear growth" button 434 and a 0.1% exponential growth rate by selecting the "0.1% expon growth" button 435. The user may also input their own fuels prices via the "user defined" button 436. The "reset" button 437 resets all fuel prices. The user may close the "fuel prices" window 430 by selecting the "x" icon 405.

Figure 25:
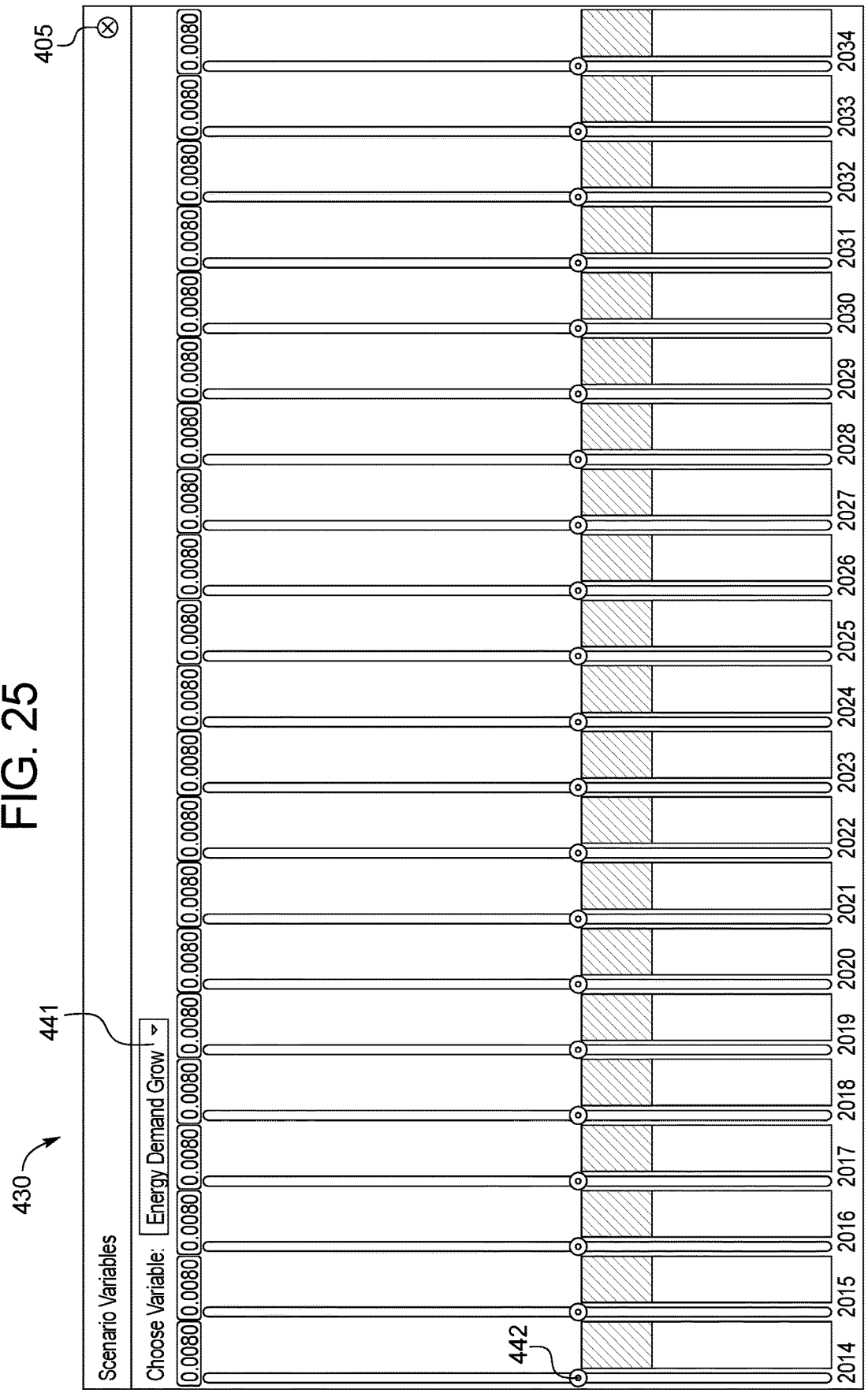
FIG. 25 illustrates an exemplary user interface for a scenario variables window.

FIG. 25 illustrates an exemplary user interface for a "scenario variables" window 440, which the user may open by selecting the "Scenario Variables" option via the "view" dropdown menu 173. The "scenario variables" window 440 provides adjustable charts from which the user may view and/or change scenario variables for each year. The user may first choose the variable they wish to view and/or edit via the "choose variable" dropdown menu 441. The list of variables may include, but is not limited to, energy demand growth, peak demand growth, renewable percentage, CO2 cap, CO2 price, SO2 cap, SO2 price, NOx cap, NOx price, Hg cap, NOx ozone cap, CPP cap, energy required, peak capacity required, and cost limit. The user may adjust the value of the variable by sliding the cursor 442 up or down for each year in which they wish to adjust the value. The user may dose the "scenario variable" window 440 by selecting the "x" icon 405.

In an embodiment, the modeling system 2 may permit local or regional simulations that may be networked across multiple users. The modeling system 2 coordinates multi-user planning such that each user has control over planning decisions made in their respective local jurisdictions, while interconnected and interacting with the infrastructure and planning decisions made by other users in neighboring power systems. Using the user interface, users may conjoin smaller regional models into larger integrated models. Or, larger or national models may be increasingly subdivided into smaller micro-managed models through the incorporation of a growing number of software users. The networking capabilities may be further augmented by data permissions, such that different types of users may have different levels of data access and software features. To make this possible and practical, multiple aspects of the software platform 3 must be designed to directly support multi-user functionality, for example, in an embodiment the software platform includes:

1.) a multi-nodal modeling algorithm may simulate discrete system-plans, with defined inter-connections to many other plans. A plan 510 refers to the coupling of a virtual energy power system model of limited geographic scale, along with associated planning instructions and variables that define changes to this power system over time;

2.) a data schema may enable coordination and cooperation among multiple users. In an embodiment, a data structure 580 supports the integration of plans 510 that are intended to inter-connect, and, further, support the coordination of many such plans 510 that are intended to be interconnected to support simulation efforts among many disparate users and groups; and 3.) a permissions schema may define how various users and groups manage data, i.e., within a group of coordinated users, who may make changes to the data that define the planning decisions and underlying modeling parameters. Without careful design, chaos ensues. While the permissions schema is technically part of the data schema, the present disclosure differentiates the management of user permissions from the management of modeling data for simplicity and clarity.

In an embodiment, the simplest possible use case to consider is two users performing coordinated simulation across two jurisdictions. The way this kind of modeling activity is currently performed (with existing modeling software) is that each user would run their own copy of modeling software, on their respective computers, using separate, but identical, data sets that describe both System A and System B. This becomes extremely tedious in practice. Each user has knowledge of data changes necessary to more accurately describe their own systems. Every time User A desires to change an input assumption, or a forward-looking variable, he loses compatibility with the modeling performed by User B. That is, his or her results will no longer match. In practice, it is difficult to even know when inconsistencies occur, and whether results generated by User A and User B are truly identical without subsequent data processing for confirmation. Further, User A and User B do not necessarily agree (or have differing requirements) for determining the appropriate input values used for the modeling forecast. In this case, User A proceeds with modeling exercises without the benefit from User B's enhancements to the data describing User B's system that would otherwise occur during coordinated conjoined planning. As real-world planning is increasingly performed at the level of regional multi-state power markets, hundreds of users are interested in local nuances spanning dozens of scenarios—creating vast potential permutations of networked simulations. Starting with the two-user coordinated simulation case, we will explain how the modeling system 2 manages information to achieves this functionality through series of examples of increasing complexity.

The modeling system 2 breaks a power system into various nodes 505 that act as a basic unit of modeling for a power system. Nodes 505 are instances of regional power systems that represent a local system. A node 505 may correspond to a U.S. State, an area within a state controlled by a utility, or some other defined region. Each node 505 may be associated with a list of neighbors that may be blank (the single node system functions in isolation) or that may include additional entities, such as other nodes 505, that the node 505 interacts with for electricity trade.

Figure 26A:
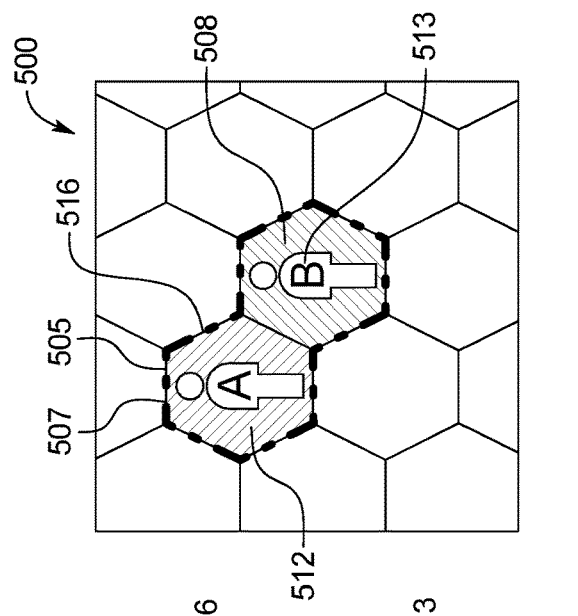
FIG. 26A illustrates a two user modeling example where a User A and a User B simulate their local systems independently using independent plans.
Figure 26B:
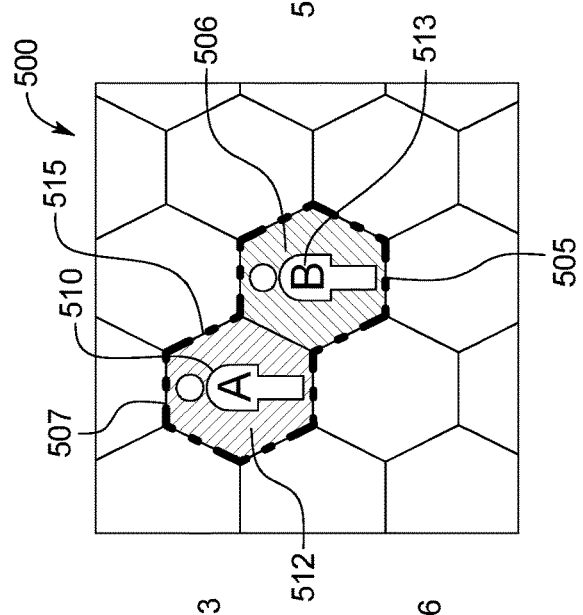
FIG. 26B illustrates a two user modeling example where a User A is simulating a model incorporating the plan of User B.
Figure 26C:
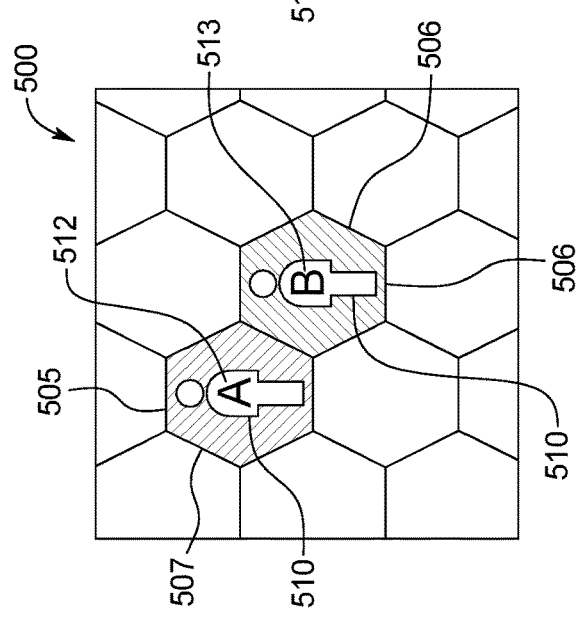
FIG. 26C illustrates a two user modeling example where a User B is simulating a model incorporating the plan of User A.
Figure 28:
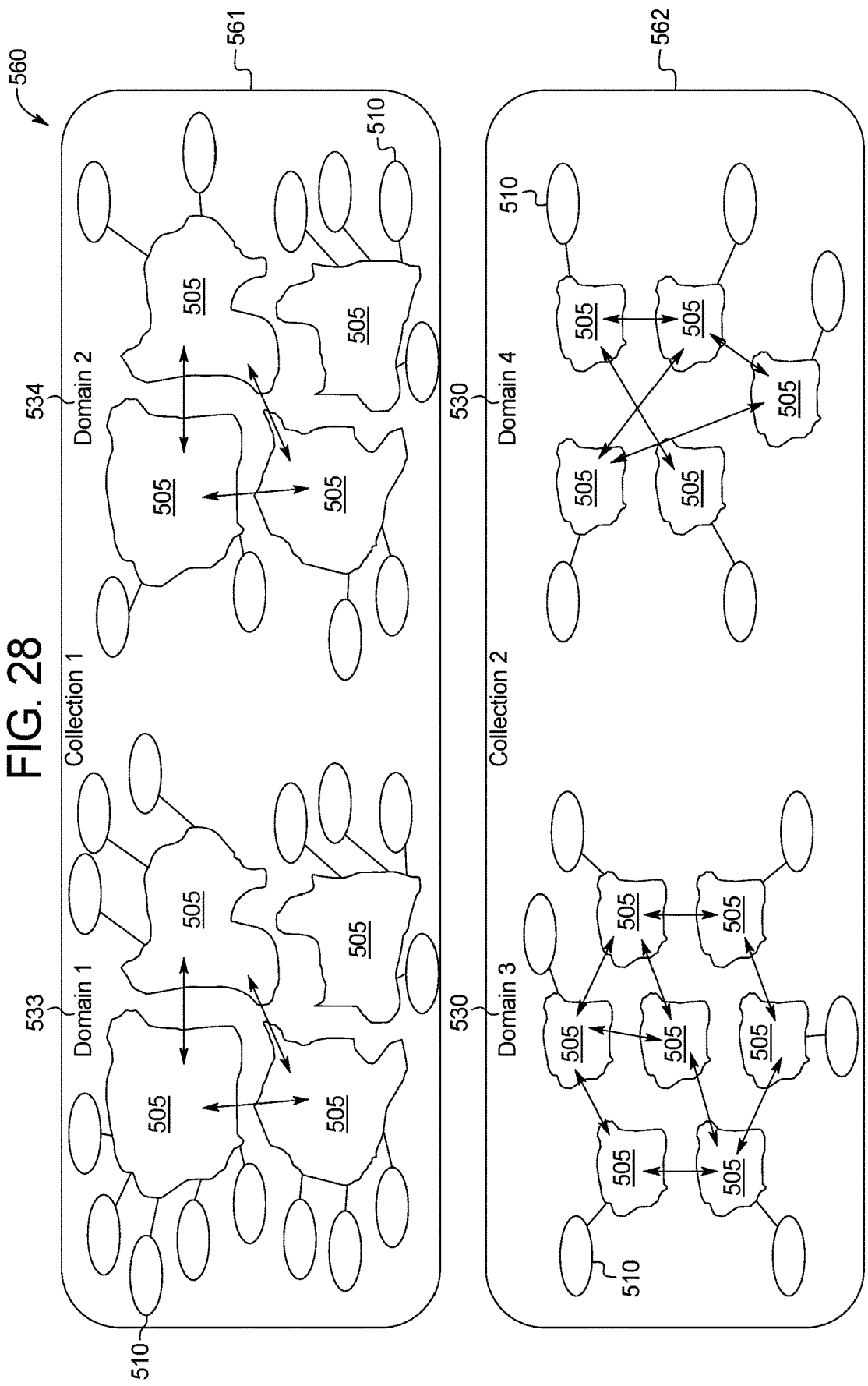
FIG. 28 is a diagram illustrating collections, a superstructure that holds sets of nodes each collection having nodes at different levels of granularity.

FIGS. 26A-C illustrates a two user example 500 showing the integration of User A's and User B's plans 510. As shown in FIG. 26A-C, each hexagon represents a node 505 and each user generates a plan 510 consisting of instructions. As diagrammed in FIG. 29, the modeling system 2 uses the plan 510 as the fundamental unit of organization. To make multi-user simulation work as intended, each plan 510 is specific to a system place and scenario, and holds a set of instructions that define prescribed changes to the system over time. Plans 510 are specific to a domain 530 (FIG. 27) and a node 505, and the node 505 is specific to a collection 560 (FIG. 28). When a user loads a plan 510, the modeling system 2 may check data identifiers held in the plan's data store to determine: 1.) which domain 530 it belongs to, 2.) whether it is blessed, 3.) which plans 510 interconnects to, and 4.) which node 505/collection 560 it represents.

In the example of FIG. 26A, User A controls a first node 507 and has generated a first plan 512 and User B controls a second node 508 and has generated a second plan 513. As shown in FIG. 26A, the users simulate their local systems independently. In the embodiment of FIG. 26A, the simulation of each plan 510 may initially ignore the influence of the neighbor's system, such as power transfers and changes to fuels and infrastructure.

Turning to FIGS. 26B and 26C, the software platform 3 may allow each user to interconnect their own plan 510 with plans 510 of other nodes 505 with little effort. The first coordinated plan 515 in FIG. 26B represents User A's perspective, having jurisdiction over the first node 507 and first plan 510 while integrated with the second node 508 and the second plan 513. The second coordinated plan 516 in FIG. 26C represents User B's perspective, having jurisdiction over the second node 508 and the second plan 513 while integrated with the first node 507 and first plan 510. In the simplest example, we assume User A and User B desire integration of only one plan 510 each. Despite the simplicity, this can't be achieved through cloud computing unless each node 505 and plan 510 is cognizant of the other's attributes. When User A requests the software platform 3 to solve this modeling scenario, the software platform 3 must merge many of the assets of the two nodes 505 and plans 510. The modeling system 2 identifies and integrates the data that represents the energy demand (load shape), energy supply (generating units), inter-nodal power transfer capacity, and the instructions from both plans 510 to solve a single modeling scenario.

In addition to integrating modeling solutions, the modeling system 2 may manage user data access to make coordinated planning practical. To allow User A to make changes to User A infrastructure, but not User B's, the modeling system 2 identifies User A as the "owner" of the infrastructure, and further identifies User A of being in a user-type class that is allowed to modify the underlying data. This removes the challenge of both User A and User B maintaining identical versions of independent data sets, as described above. Similarly, User A and User B are owners of their respective plans 510. Conventionally, this may mean that User A may view but not alter User B plans 510 and vise versa. However, plan permission attributes may allow for both User A and B to edit each other's plans similar to a web-shared word processing document. Further, permission settings may allow User A and User B to interact with the other's plan 510 without the ability to read/see it. While this may sound like an unusual circumstance, it is a very practical use case for the real-world state and regional planning initiatives, where the planners are employed by competing utility companies who consider their planning decisions to be proprietary.

The modeling system 3 may permit use by more than two users. Turning to FIG. 27, illustrated is a three-user modeling example. While adding further users increases complexity, this complexity may be managed by considering how users might desire variants to both independent and coordinated scenarios. In an example embodiment, we assume three users from Nebraska, Kansas, and Oklahoma are interested in examining alternative energy futures in collaboration, but also independent of the scenarios which they specifically develop in collaboration. Looking at FIG. 27, shown is a first domain 533 and a second domain 534. Each domain 530 includes plans 510 denoted by a state corresponding to a node 505. In the first domain 533 (at left), a user from each of the three states has agreed to the rules of the first domain 533 to co-develop a conservative scenario for supplying energy with only modest emissions reductions.

At the left of FIG. 27, the Nebraska node is interconnected to Kansas and Oklahoma nodes. The owners have identified a plan 510 for each node as being "blessed." In an embodiment, blessed plans 540 from neighboring nodes 505 only interact with blessed plans 540 within a particular domain 530. Within a given domain 530, each user may have multiple plans 510 for a node 505, but only one plan 510 from each node 505 may be designated as blessed. To interconnect, within a domain 530, each node 505 must be identified to the others as a "neighbor". As in prior examples, each node 505 has a defined load shape—characterizing the energy demand for the local and regional power system, and each node 505 defines a quantity of transfer capacity "STC" allowing for flow of power between the local and regional system.

In an embodiment, the rules of the domain 530 may be enforced by the modeling system 2. For example, when a plan 510 is added to a domain 530, it may be checked for its compliance with the rules of the domain 530. If the plan 510 does not comply with the rules, the modeling system 2 may deny a request to make the plan 510 a blessed plan 540.

As shown in FIG. 27, the Nebraska user is considering alternative plans by creating a second Nebraska plan 546 that interacts with the blessed versions of Kansas and Oklahoma. Alternately, all three users may choose to create an alternative scenario, in which case the three new plans 510 are created (one for each node) and designated as blessed within a separate second domain 534 (shown at the right of FIG. 27).

To further the example, the planner from Nebraska is also interested in examining a separate scenario that achieves deep emission reductions, however, his neighbors are not similarly interested. The Nebraska planner may choose to develop this plan first while ignoring interconnections to his neighbors. He makes a copy of the first Nebraska plan 545; and creates a second Nebraska plan 546 that is designated as not interconnected to its neighbors (specifically, the plan copy is set so that regional dispatch=false). The Nebraska planner modifies the second plan 546 to reduce emissions and is further interested in seeing how a carbon tax might favor the Nebraska planning decisions in this case or regional power trading. To do so, the Nebraska planner creates a copy of the clean second plan 546 and designates that the new third Nebraska plan 547 that is again interconnected to its neighbors. The software platform 3 allows the Nebraska user to modify a unique "Scenario", wherein he is now able change the price of carbon, wherein the cleaner Nebraska power plants will preferentially dispatch more competitively than the higher emitting plants in the other states. The third Nebraska plan 547 is not blessed in Domain One, however, so that the plans developed by Kansas and Oklahoma still only interact with the blessed first Nebraska plan 545 and blessed scenario variables having no carbon price.

The Nebraska planner now wishes to compel his neighbors to also examine a low carbon emission trajectory. He designates the third Nebraska plan 547 as belonging to a low carbon planning "group" and designates the plan as group-readable. Now, his neighbors in Kansas and Oklahoma are also designated as group members, and thus able to read the low carbon plans and evaluate the economic advantages incurred when the second Nebraska plan 546 is integrated with their conservative (higher emitting) plans in the carbon priced scenario. Kansas and Oklahoma planners would now like to investigate a similar clean energy strategy. To do so, three blessed plans 550 are established in a new domain (Domain Two in FIG. 27). Each of the low-carbon plans 550 are assigned to Domain Two, designated as blessed so that they interact together, designated to use the low carbon scenario, and designated to provide read-access for the group members.

The last example of multi-userism requires consideration of a large number of nodes 505, users, and permissions 680 (FIG. 30B). Just as in the two and three person examples above, the modeling system 2 may allow any given regional or national energy system to be sub-divided into many nodes—each amenable for integrated multi-user modeling.

Parameters and plans 510 for each individual node 505 may further be managed not just by individuals but also groups, with data permissions 680 to make distributed data management practical. The modeling system 2 coordinates the analytics of the macro-simulation, such that each individual local system is aware of the changes occurring in each of its neighboring nodes 505 that comprise its associated region. The "vast users" example is made possible by the underlying multi-nodal modeling solution discussed earlier, taking advantage of problems solved by multi-nodal modeling, and made practical through a sophisticated implementation of user permissions, and data schema to manage both systems modeling and multi-userism.

As the number of users, nodes, scenarios, and planning configurations proliferate, the potential permutations become vast. The modeling system 2 may make it possible for thousands of users to interact effectively and efficiently across a far greater magnitude of planning scenarios than any other system of its kind.

Many of the complexities of multi-userism are made easily manageable through designations to the plan. FIG. 30B illustrates a new plan window 670. Using the new plan window 670, a user or administrator may create a new plan 510 for a node 505. The user may enter an owner of the plan 510, a group to which the plan belongs, a name of the plan 520, a description of the plan 510, etc. The new plan window 670 may include a button to auto-populate the plan by copying data from other plans. The user may additionally select a node 505 for the plan 510 and a domain 530.

Additionally, the user may set various permissions 680, such as owner permissions 680, group permissions 680, and global (world) permissions 680. For each of owner, group and global permissions 680, the user may enable a read permission, an edit permission, and a destroy permission.

Figure 29:
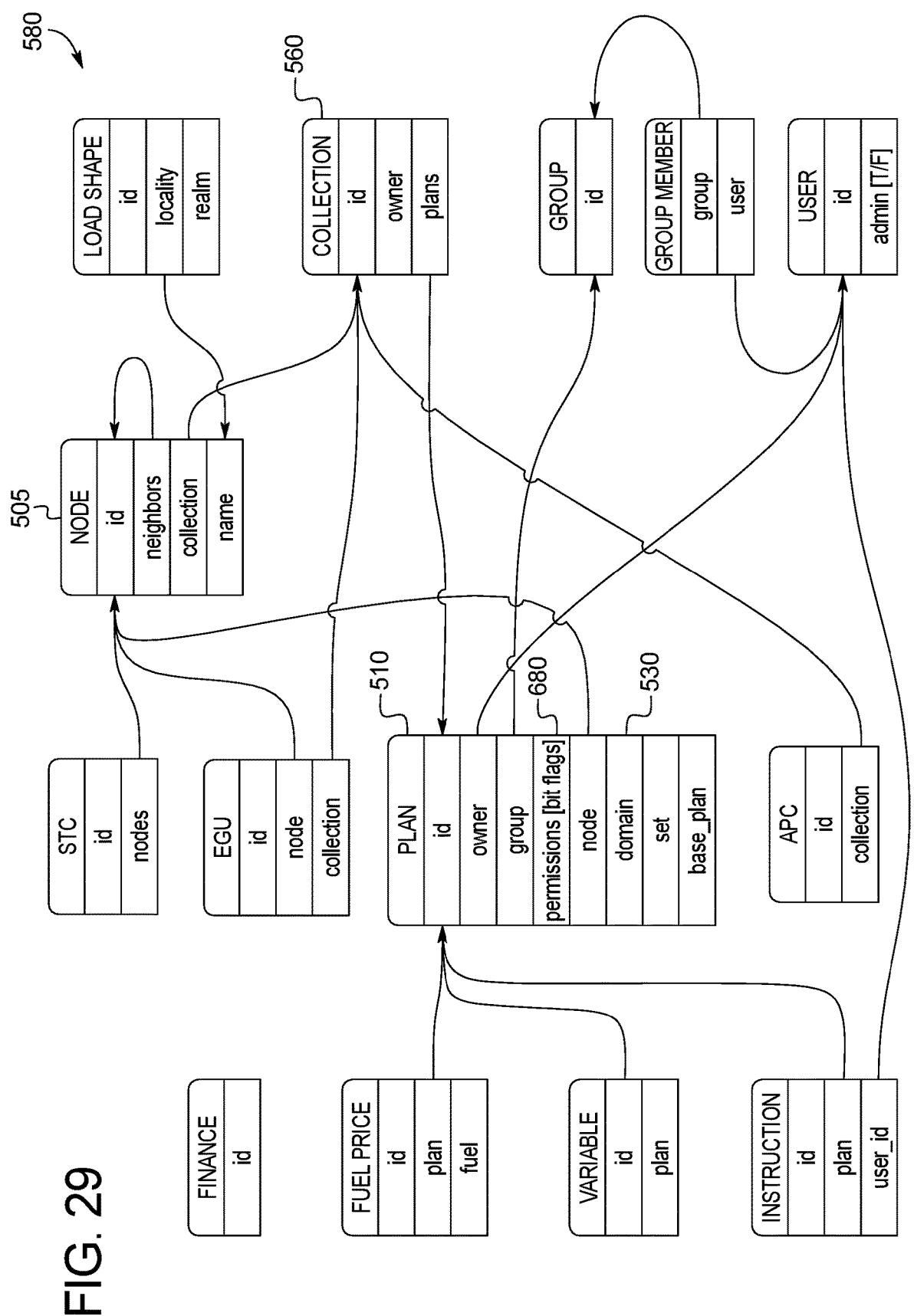
FIG. 29 is a diagram illustrating a table of the data structure of the modeling system.

The data structure 580 of the modeling system 2 may include data access permissions—enabling variable degrees of access to information, commensurate with the needs and interests of real world market actors, such as utility owners, regulators, and industry stakeholders. Plans 510, nodes 505, and associated data may be protected from unauthorized access and modification. First, each EGU (or other simulated infrastructure) and plan 510 has "World-Read" and "World-Write" attributes which control whether any arbitrary user can read and/or write to that specific data item. Second, each EGU and plan may have a "Group" attribute. Users may be assigned to the same group as the EGU or plan 510. A table of the data structure of the modeling system 2 is shown in FIG. 29. The data structure includes permissions (e.g. "Read" and "Write") that specify what permissions a group member has for each EGU and plan. Each EGU and plan 510 may include an owner attribute that matches one specific user. In an embodiment, the owner automatically has full read and write privileges. The owner may define whether the plan or EGU may be viewed, or edited by the owner only, one or more groups, or world. Finally, each EGU may have a designated owner who defines whether its input or projection data may be viewed, or edited by the owner only, or one or more groups (i.e. the owner determines which other users may see results indicating performance of a power plant in a given scenario; and see and/or make changes to underlying data describing the power plant).

With these permissions now layered into the networked planning capabilities, the modeling system 2 has the capability to consider the needs of real world market actors as they balance proprietary information affecting competitive market positioning with the desire and/or requirements for public and regulatory cooperation and disclosure. The control of information made possible by the data permissions described above makes collaborative multi-user cooperation across real-world organizations far more practical. For example, the modeling system 2 may be adapted for the following market actors with varying perceptions of propriety over information: an independent system operator that has a need for and right to access data for all generating units and plans within a multi-state planning area; a state regulator that has planning authority over all generating units in its state and planning decisions with state (the regulators willingness to share information with other states is discretionary); electric utilities operating in the multi-state region and have planning authority over the generating units that they own. (The utilities' willingness to share information with anyone other than the regulator and market operator is discretionary.); and stakeholders and the public have interest in state-wide or regional planning outcomes, but not necessarily requiring access to information describing individual EGUs.

As part of proposed federal U.S. carbon regulations, a very realistic possibility is that, in each state, regulatory agencies will be required to conduct stakeholder meetings where modeling scenarios are developed in collaborative effort among energy companies, consumer and environmental advocates. Each state would likely be responsible for an official plan, or plans, for submission to federal regulators that would be represented as "blessed plans" 540. Copies of state plans could be provided to each of the individual companies or stakeholders for independent examination and manipulation of alternative possibilities. The states with closely interconnected systems could choose to interconnect their modeling. Further, like-minded users from multiple states could create regional plans, for instance a solar-intensive or a nuclear-intensive scenarios, by creating independent domains within which to combine similar planning objectives.

Market actors (both in government and private industry) have requirements to (as well as self-interest and sensitivity to) information published for public access. To make a plan world-readable is the equivalent of publishing it to all users. By also having user permissions, the modeling system controls what information can be accessed, and by whom, in the case of a published plan. With the minimal permissions, a user can see only the system level results, and not unit level results. This allows for a public planning process to proceed openly, without concerns from individuals over whether their infrastructure is/should be openly scrutinized. Another user type may be permitted to see unit level data, but only for units that belong to his group. Another user may be permitted see all available information (for example, if the users are in the same group).

The modeling system 2 makes multi-user cooperation practical for a single, or a very large number of planning efforts. For example, referring back to FIG. 5, the interlapping fried eggs reside within a single domain 530, wherein plan instructions are coordinated between nodes 505 (presumably managed by many coordinated participants). Domains 530 can be analogized to a stack of pages with figures similar to FIG. 5. Each "page" represents an alternate possibility 530—wherein and plans 510 may interact uniquely. In an embodiment, a given plan 510 may exist in only one domain 530, and may interact only within other plans 510 within that domain 530. As discussed below, a domain 530 may hold multiple plans 510 for any given node 505. The domain 530 defines which of these many plans 510 interact with each other. In the OK/NE/KS example, there are only 3 states considered. If, for example, a user from each state creates 10 to 15 plans 510 as part of planning efforts, which of those plans make sense to be networked to the others? Domains 530 are used to manage these questions so that the users can make deliberate planning decision that assume similar regional assumptions and objectives. So if one possibility is that only NE increases it's renewable energy requirements, but the other 2 states do not, then the associated plans reflecting those assumptions would be designated to belong in the same domain 530. This possibility can be compared to an alternative where all three increasing renewable requirement—in a separate domain 530. Within each domain 530, only one plan 510 can be blessed so that the modeling system 2 may determine which of many possible plans 510, are the correct interconnecting plans 510.

Within a given domain 530, the linkages between data objects that make networked multi-user planning possible are illustrated in FIG. 29. In an embodiment, the modeling system 2 may include various collections 560 that enable modeling power systems at different levels of granularity. As shown in FIG. 28, a collection 560 is a super-structure that holds sets of nodes 505. The combined nodes 505 in a collection 560 represent a model of a larger combined entity, such as the U.S. power system. Within each collection 560, each node 505 represents a unique entity (e.g., only one Texas node per collection). Collections 560 allow for the modeling of a similar overarching systems using differing subdivisions of the system into differing nodes 505. For instance, the contiguous U.S. could be sub-divided into 48 state-level nodes 505 in one collection 560, and sub-divided into several hundred utility-scale nodes in another collection 560. Collections 560 also hold data for the physical infrastructure within nodes (e.g., existing power plants, new construction and pollution control prototypes). For instance, a first collection 560 may characterize each individual EGU as it exists in reality, while a second collection 560 may aggregate these EGUs into larger hypothetical EGUs for use in simplified or educational modeling exercises.

Figure 30A:
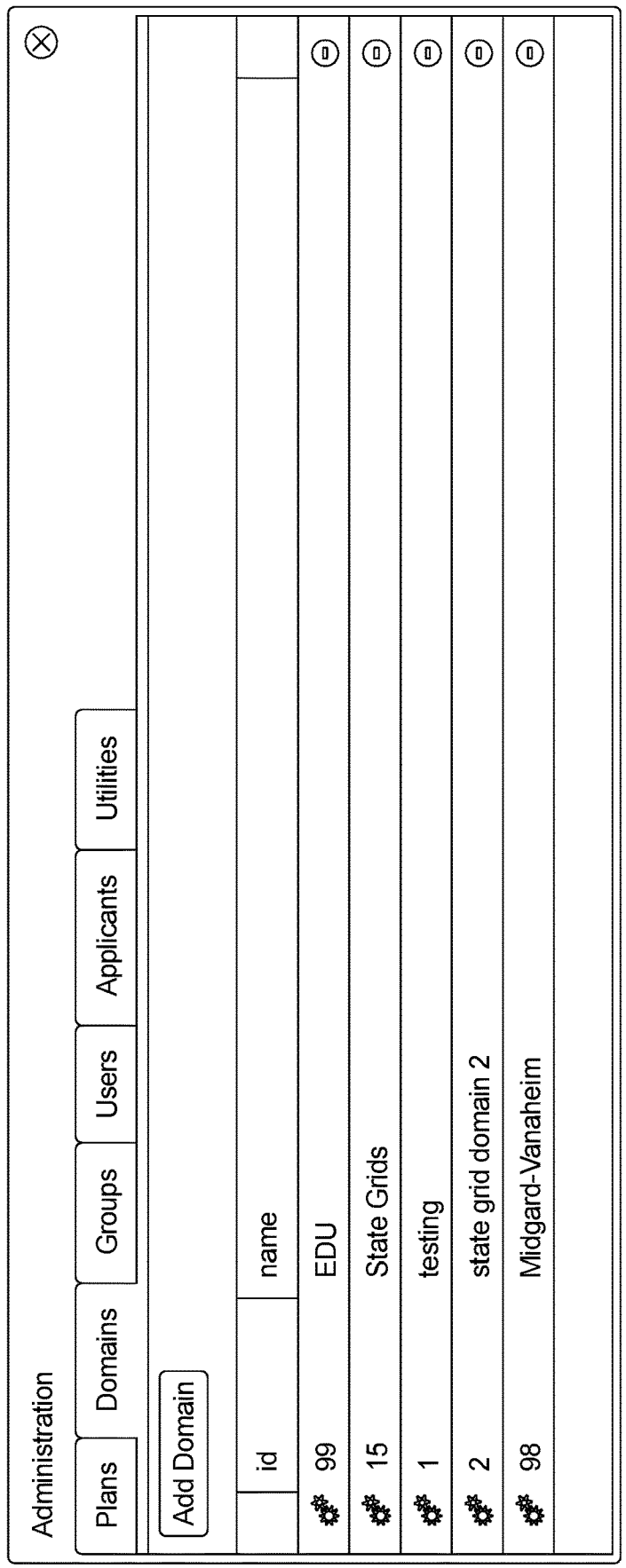
FIG. 30A illustrates an administration screen that permits an administrator to create and manage domains.

Domains 530 and collections 560 are indirectly linked via the plan 510. FIG. 30A illustrates an administration screen 650 that permits an administrator to create and manage domains 530. As shown, the administrator may create a new domain 530, or remove an existing domain 530. Domains 530 and collections 560 work together to allow the user to create what might best be thought of as parallel universes. A domain 530 allows for different decisions to made across different universes. A collection 560 allows for the physical characteristics to be defined differently between universes. Scenarios allow for variations in common variables such as fuel prices, or emission limits, and is therefore also how a universe is defined. However, scenario variability is a commonly used approach to perform modeling sensitivity analysis, whereas domains 530 and collections 560 are unique constructs that manage the complexities created by multi-userism.

Referring back to FIG. 26, the plans for User A and User B reside in the same collection, such that User A is always using current data from User B and vis versa. If User B does not want User A to benefit from his data improvements to his plans, his plans must reside in a different collection 560. Collections 560 allow for different definitions of nodes 505—for instance, nodes 505 can be defined at the state level, or at larger regional levels, or smaller utility-system levels. Additionally, collections 560 permit different sets of nodes 505 and interconnections between nodes 505—i.e. within a collection 560, the sets of nodes 505 that combine into larger regional systems are defined. If representatives from a state wished to compare the implications between joining each of two different regional markets, this could be simulated by networking the state node with the neighboring nodes from the first regional market in one collection 560, and with the neighboring nodes from the second regional market in a second collection 560. As another example. if a regional transmission system operator were to compare two futures, one with more or less transmission capacity between nodes 505, this would also be managed through two or more collections—each with different terms describing the level of interconnectivity between nodes. In addition to characterizing the larger scale system, collections 560 permit different smaller-scale infrastructure components. Each collection 560 has its own copy of physical infrastructure components, such as power plants and pollution controls. This also allows for non-cooperative groups to independently manage the assumptions for data underlying their simulations. For instance, a utility group may develop its own planning and modeling exercises with very nuanced concern and interest to modify unit level parameters. Another group may wish to perform a more macro level analysis, wherein the assumptions for individual EGUS do not require detailed management. In the first case, the data describing EGUs may evolve significantly, while in the second case it may not. Collection-specific treatment of infrastructure also allows for all or part of a regional system to be simplified. This could be for educational purposes or to allow a planner to work with neighboring systems with less granularity for ease of use.

One or more controllers 11 control aspects of the systems and methods described herein. The one or more controllers 11 may be adapted run a variety of application programs, access and store data, including accessing and storing data in associated databases, and enable one or more interactions via the user device 3. Typically, the one or more controllers 11 are implemented by one or more programmable data processing devices. The hardware elements, operating systems, and programming languages of such devices are conventional in nature, and it is presumed that those skilled in the art are adequately familiar therewith.

For example, the one or more controllers 11 may be a PC based implementation of a central control processing system utilizing a central processing unit (CPU), memories and an interconnect bus. The CPU may contain a single microprocessor, or it may contain a plurality of microprocessors for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory stores at least portions of instructions for execution by the CPU and data for processing in accord with the executed instructions.

The one or more controllers 11 may also include one or more input/output interfaces for communications with one or more processing systems. Although not shown, one or more such interfaces may enable communications via a network, e.g., to enable sending and receiving instructions electronically. The communication links may be wired or wireless.

The one or more controllers 11 may further include appropriate input/output ports for interconnection with one or more output displays (e.g., monitors, printers, user interface, motion-sensing input device, etc.) and one or more input mechanisms (e.g., keyboard, mouse, voice, touch, bioelectric devices, magnetic reader, RFID reader, barcode reader, user interface, motion-sensing input device, etc.) serving as one or more user interfaces for the controller 11. For example, the one or more controllers 11 may include a graphics subsystem to drive the output display. The links of the peripherals to the system may be wired connections or use wireless communications.

Although summarized above as a PC-type implementation, those skilled in the art will recognize that the one or more controllers 11 also encompasses systems such as host computers, servers, workstations, network terminals, and the like. Further one or more controllers 11 may be embodied in a user device 3, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a controller for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A system for modeling networks of electricity supply and demand comprising:
 a first user interface;
 a second user interface;
 a database including a data set defining one or more nodes and one or more plans, each node being a geographic area having one or more energy infrastructures, each energy infrastructure having an electricity supply and demand, each plan including instructions related to a node for managing the one or more energy infrastructures and electricity supply and demand changes over a predetermined time, wherein the predetermined time is greater than three months,
 a controller in communication with the database, the first user interface, and the second user interface; and
 a memory including instructions, that when executed by the controller, cause the controller to:
  receive, via the first user interface, a first request to create a first plan for a first node,
  receive, via the first user interface, first plan instructions for the first plan, wherein the first plan instructions for the first plan define supply and demand changes of the one or more energy infrastructures of the respective node over the predetermined time;
  simulate the first plan based on the first plan instructions for the first plan to establish a first simulated plan;
  receive, via the second user interface, a second user request to create a second plan for one of the first node or a second node, wherein the second plan includes second plan instructions for the second plan that define electricity supply and demand changes of the one or more energy infrastructures of the respective node over the predetermined time;
  simulate the second plan based on the second plan instructions for the second plan to establish a second simulated plan; and
  in response to a user request to generate a forecast associated with the first plan and the second plan, generate the forecast including a projected value for an energy infrastructure variable based on the first plan and the second plan by at least in part merging the first simulation and the second simulation, wherein merging includes at least integrating data representing energy demand and energy supply.

2. The system of claim 1, wherein the forecast includes a graphic representation for the first plan illustrating energy supply contributions to first node demand, the graphic representation including imports of electricity supply from the second node according to the second plan.

3. The system of claim 1, wherein the data set includes a collection of nodes, the nodes of the collection having a different granularity than granularities of the first node and the second node, wherein the first node and the second node encompass a first scope of geography, and the nodes of the collection encompass a scope of geography distinct from the first node and the second node.

4. The system of claim 1, wherein the controller is further configured to:
 receive, via the second user interface, an additional request to create an additional plan for the second node;
 in response to receiving a further request via the second user interface to record the additional plan as blessed, recording the additional plan as blessed in the data structure;
 in response to a user request to generate a forecast associated with the first plan, the first plan instructions including a plan instruction to interconnect the first node with the second node, performing a lookup in the data structure to select the currently blessed plan for the second node as recorded in the data structure; and
 generate the forecast including a projected value for an energy infrastructure variable based on the first plan and the currently blessed plan for the second node.

5. The system of claim 1, wherein a plan instruction to interconnect the first node with the second node in the first plan includes: a plan instruction to define a transmission bandwidth to the first node, a plan instruction to define the second node as a neighbor, and a plan instruction to define a regional loadshape corresponding to aggregate loads in the first node and the second node.

6. The system of claim 1, wherein the data set defines one or more transmission links between one or more nodes, wherein each transmission link is associated with one or more de-rating weighting factors.

7. The system of claim 1, wherein the forecast includes both a projected value and a determination of compliance of at least one variable of the list of variables including peak capacity, electricity generation, renewable electricity supply, generation cost, average rate, and emissions of sulfur dioxide, nitrogen oxide, and carbon dioxide.

8. The system of claim 1, wherein the forecast includes a projected value for an energy infrastructure variable based on the first plan and the second plan includes solving a regional dispatch for an aggregate regional load shape to generate the forecast, wherein, during the generation of the forecast, all electricity generating units in the first node and the second node are dispatched, and wherein, during the generation of the forecast, all electricity generating units in the instructions of the first plan and the second plan are also dispatched.

9. The system of claim 1, wherein the controller simulates the first plan based on the first plan instructions independently from simulating the second plan based on the second plan instructions.

10. The system of claim 1, wherein the controller simulates the first plan based on the first plan instructions in response to a user command to simulate the first plan based on the first plan instructions.

11. The system of claim 1, wherein the controller simulates the second plan based on the second plan instructions in response to a user command to simulate the second plan based on the second plan instructions.

12. The system of claim 1, wherein merging further includes integrating at least one of inter-nodal power transfer capacity or both of the first plan instructions and the second plan instructions.

13. A system for modeling networks of electricity supply and demand comprising:
- a first user interface;
- a second user interface;
- a database including a data set defining one or more nodes and one or more plans, each node being a geographic area having one or more energy infrastructures, each energy infrastructure having an electricity supply amount and demand amount, each plan including instructions related to a node for managing the one or more energy infrastructures and electricity supply and demand changes over a predetermined time, wherein the demand amount is determined using an individual demand value for each multi-hour, hour, or sub-hour interval over the predetermined time of the plan;
- a controller in communication with the database, the first user interface, and the second user interface; and
- a memory including instructions, that when executed by the controller, cause the controller to:
  - receive, via the first user interface, a first request to create a first plan for a first node,
  - receive, via the first user interface, first plan instructions for the first plan, wherein the first plan instructions for the first plan define supply and demand changes of the one or more energy infrastructures of the respective node over the predetermined time;
  - simulate the first plan based on the first plan instructions for the first plan to establish a first simulated plan;
  - receive, via the second user interface, a second user request to create a second plan for one of the first node or a second node, wherein the second plan includes second plan instructions for the second plan that define electricity supply and demand changes of the one or more energy infrastructures of the respective node over the predetermined time;
  - simulate the second plan based on the second plan instructions for the second plan to establish a second simulated plan; and
  - in response to a user request to generate a forecast associated with the first plan and the second plan, generate the forecast including a projected value for an energy infrastructure variable based on the first plan and the second plan by at least in part merging the first simulation and the second simulation, wherein merging includes at least integrating data representing energy demand and energy supply.

14. The system of claim 13, wherein the demand amount includes a peak demand amount and an off-peak demand amount.

15. The system of claim 13, wherein the controller simulates the first plan based on the first plan instructions independently from simulating the second plan based on the second plan instructions.

16. The system of claim 13, wherein the controller simulates the first plan based on the first plan instructions in response to a user command to simulate the first plan based on the first plan instructions.

17. The system of claim 13, wherein the controller simulates the second plan based on the second plan instructions in response to a user command to simulate the second plan based on the second plan instructions.

18. The system of claim 13, wherein merging further includes integrating at least one of inter-nodal power transfer capacity or both of the first plan instructions and the second plan instructions.

* * * * *